(12) United States Patent
Steinberger et al.

(10) Patent No.: US 10,879,642 B2
(45) Date of Patent: Dec. 29, 2020

(54) BUSBAR SYSTEM

(71) Applicant: Woehner GmbH & Co., KG Elektrotechnische Systeme, Roedental (DE)

(72) Inventors: Philipp Steinberger, Coburg (DE); Maximilian Rau, Ebersdorf (DE)

(73) Assignees: WOEHNER GMBH & CO., Roedental (DE); KG ELEKTROTECHNISCHE SYSTEME, Roedental (DE)

( * ) Notice: Subject to any disclaimer, the term of this patent is extended or adjusted under 35 U.S.C. 154(b) by 104 days.

(21) Appl. No.: 16/099,617

(22) PCT Filed: May 5, 2017

(86) PCT No.: PCT/EP2017/060826
§ 371 (c)(1),
(2) Date: Nov. 7, 2018

(87) PCT Pub. No.: WO2017/198484
PCT Pub. Date: Nov. 23, 2017

(65) Prior Publication Data
US 2019/0393640 A1    Dec. 26, 2019

(30) Foreign Application Priority Data

May 17, 2016   (EP) .................................... 16169977
Sep. 30, 2016  (EP) .................................... 16191898

(51) Int. Cl.
*H01R 13/447* (2006.01)
*H01R 9/28* (2006.01)
(Continued)

(52) U.S. Cl.
CPC ......... *H01R 13/447* (2013.01); *H01R 9/2458* (2013.01); *H01R 9/28* (2013.01);
(Continued)

(58) Field of Classification Search
CPC ...... H01R 13/447; H01R 9/2458; H01R 9/28; H01R 13/506; H01R 25/162;
(Continued)

(56) References Cited

U.S. PATENT DOCUMENTS 3,018,320 A * 1/1962 Rowe ....................... H02G 5/06
                                                          174/99 B
3,096,131 A * 7/1963 Adams ..................... H02B 1/21
                                                          439/212
(Continued)

FOREIGN PATENT DOCUMENTS

CN          104682071 A       6/2015
DE    10 2013 103 544 A1     10/2014
(Continued)

OTHER PUBLICATIONS

International Search Report corresponding to international application No. PCT/EP2017/061675, dated Aug. 1, 2017 (11 pages).
(Continued)

*Primary Examiner* — Travis S Chambers
(74) *Attorney, Agent, or Firm* — Maginot, Moore & Beck, LLP

(57) ABSTRACT

Power busbar system for connecting devices having at least one contact protection baseplate module for receiving elongated and electrically conductive power busbar modules each having a plurality of uniformly spaced contact openings of a contact opening array, wherein electrical connecting contacts of a device to be connected are configured to be inserted into the contact openings of the contact opening array of the electrically conductive power busbar modules for producing an electrical and mechanical connection.

29 Claims, 23 Drawing Sheets

(51) Int. Cl.
*H02B 1/052* (2006.01)
*H02B 1/056* (2006.01)
*H01R 13/506* (2006.01)
*H01R 25/16* (2006.01)
*H01R 9/24* (2006.01)
*H02B 1/044* (2006.01)
*H01R 13/66* (2006.01)

(52) U.S. Cl.
CPC ......... *H01R 13/506* (2013.01); *H01R 25/162* (2013.01); *H02B 1/044* (2013.01); *H02B 1/052* (2013.01); *H02B 1/056* (2013.01); *H02B 1/0523* (2013.01); *H01R 13/6691* (2013.01)

(58) Field of Classification Search
CPC .............. H01R 13/6691; H01R 13/114; H01R 25/142; H01R 25/16; H01R 25/161; H01R 31/02; H01R 25/14; H02B 1/044; H02B 1/052; H02B 1/0523; H02B 1/056; H02B 1/20
USPC .......... 439/135, 45, 110, 111, 114, 116, 207, 439/212, 213, 251
See application file for complete search history.

(56) References Cited

U.S. PATENT DOCUMENTS

| | | | | |
|---|---|---|---|---|
| 3,124,403 A * | 3/1964 | Rowe | ...... | H02G 5/08 439/212 |
| 3,346,776 A * | 10/1967 | Olashaw | ...... | H02B 1/36 361/608 |
| 3,571,779 A * | 3/1971 | Collier | ...... | H01R 9/28 439/587 |
| 4,243,291 A * | 1/1981 | Leighton | ...... | H01R 13/642 439/679 |
| 4,567,654 A * | 2/1986 | Kloenne | ...... | H01R 31/085 29/876 |
| 4,758,172 A * | 7/1988 | Richards | ...... | H01R 25/14 174/72 B |
| 6,238,225 B1 * | 5/2001 | Middlehurst | ...... | H02G 5/005 439/212 |
| 7,307,227 B2 * | 12/2007 | Buettner | ...... | H01H 71/08 200/51.11 |
| 8,939,800 B2 * | 1/2015 | Hoppmann | ...... | H01R 9/2458 439/709 |
| 10,418,766 B2 * | 9/2019 | Jiang | ...... | H02B 1/205 |
| 2002/0013935 A1 * | 1/2002 | Boggs | ...... | G06F 11/3636 717/124 |
| 2006/0121796 A1 | 6/2006 | Josten et al. | | |
| 2015/0111426 A1 * | 4/2015 | Buettner | ...... | H02B 1/06 439/607.01 |
| 2018/0337499 A1 * | 11/2018 | Goebbels | ...... | H01R 43/04 |

FOREIGN PATENT DOCUMENTS

| | | |
|---|---|---|
| DE | 10 2013 103544 A1 | 10/2014 |
| DE | 20 2015 106673 U1 | 1/2016 |
| EP | 1 672 743 A1 | 6/2006 |
| EP | 1 742 315 A1 | 1/2007 |
| EP | 2 863 496 A1 | 4/2015 |
| WO | 2004057716 A1 | 7/2004 |
| WO | 2013054873 A1 | 4/2013 |

OTHER PUBLICATIONS

International Search Report corresponding to International Appl. No. PCT/EP2017/060826, dated Dec. 19, 2017, (11 pages).
European Search Report corresponding to European application No. 16169977.2, dated Oct. 27, 2016, (9 pages).

* cited by examiner

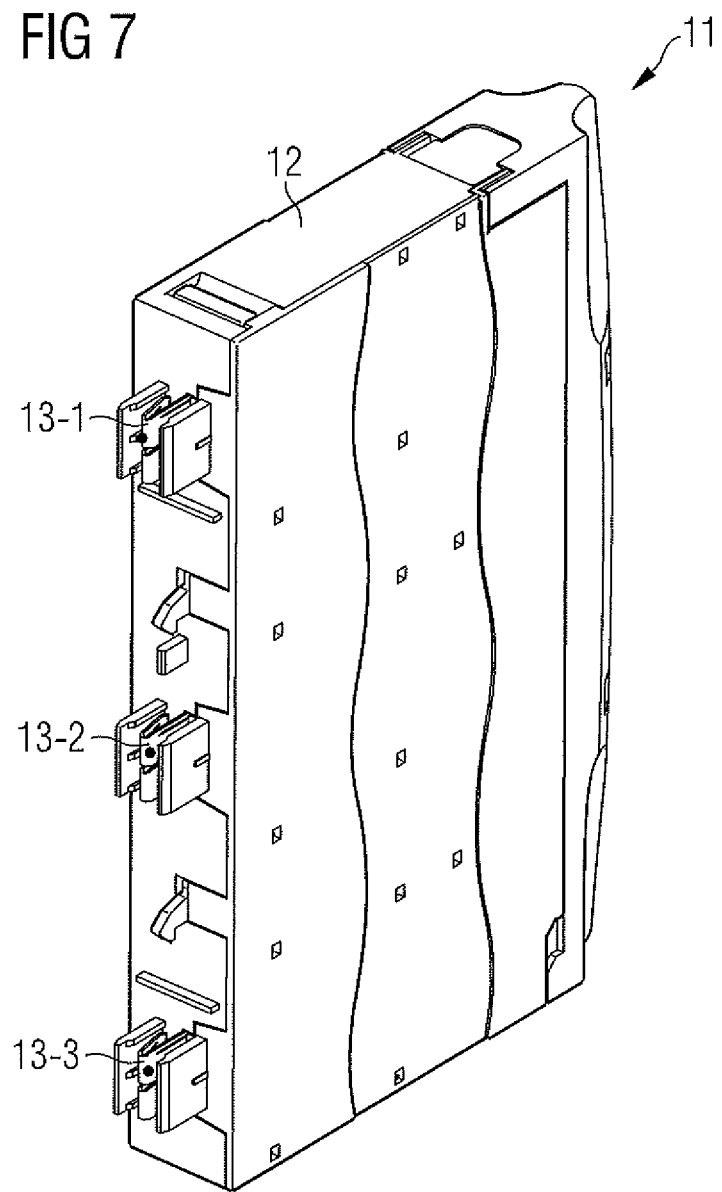

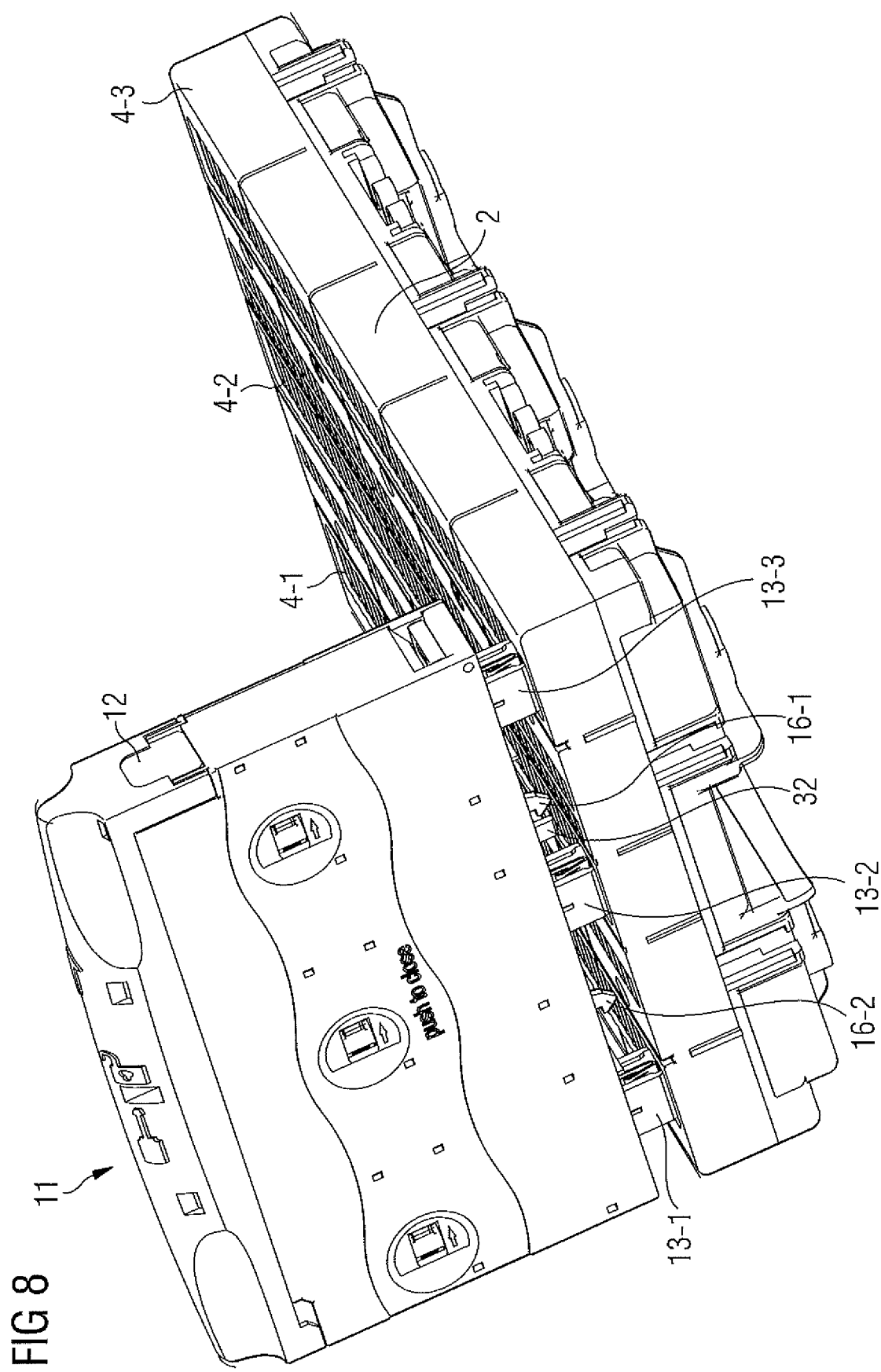

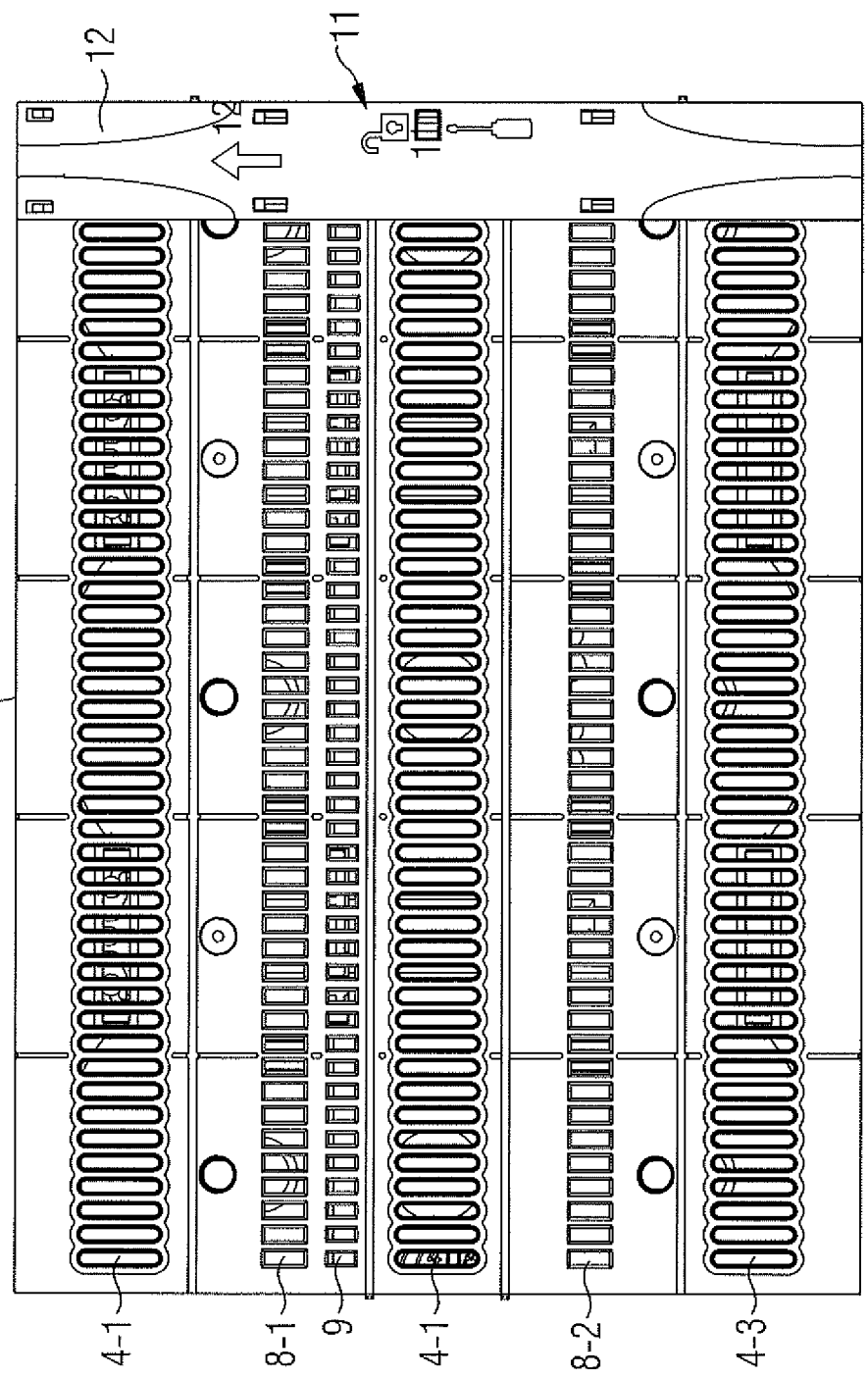

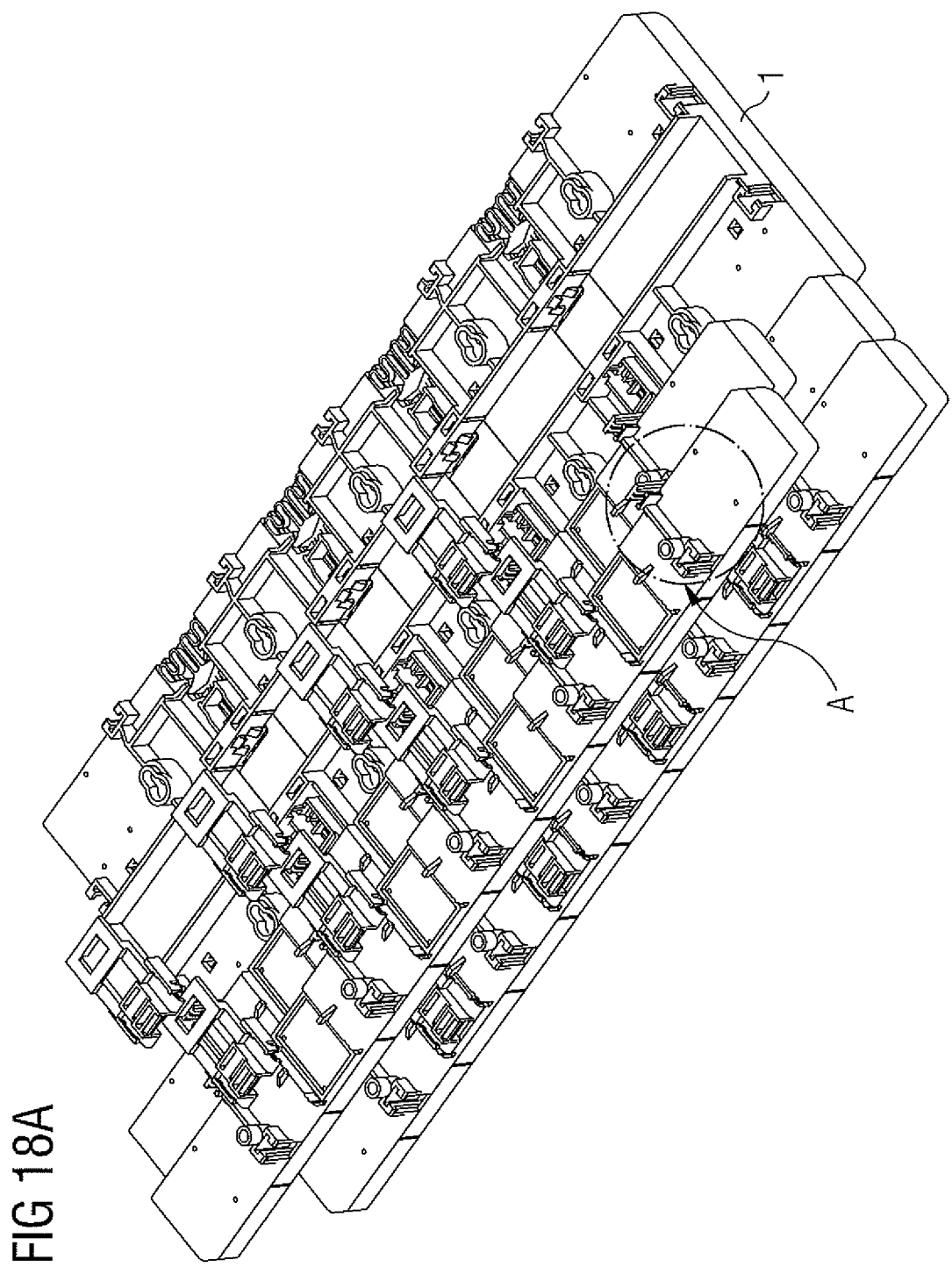

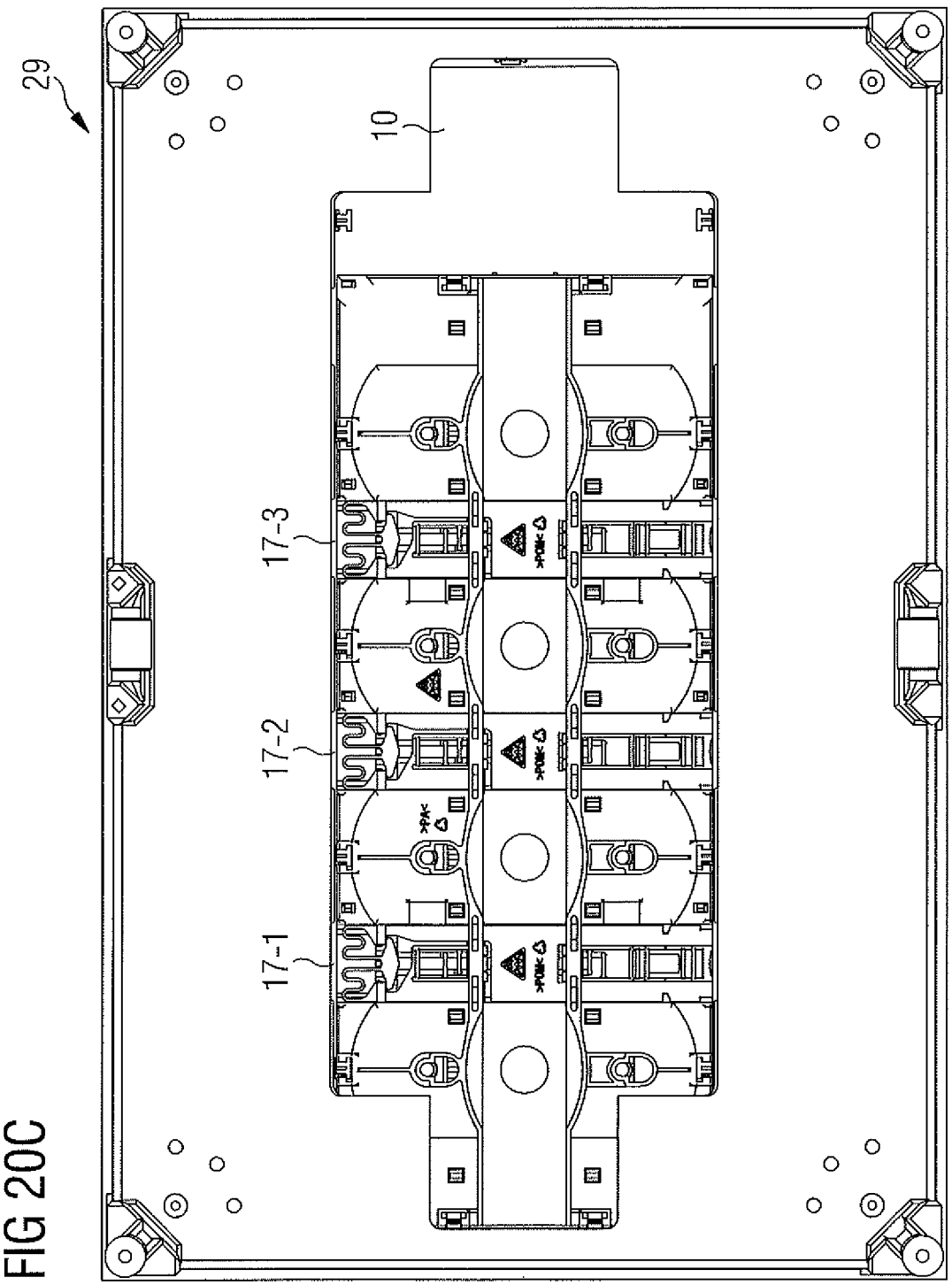

BUSBAR SYSTEM

This application is a 35 U.S.C. 371 National Stage application of PCT/EP2017/060826, filed May 5, 2017, and claims priority to European Application No. EP 16169977.2, filed on May 17, 2016 and European Application No. EP 16191898.2, filed on Sep. 30, 2016. The entire contents of the above-mentioned patent applications are incorporated herein by reference as part of the disclosure of this U.S. application.

The invention relates to a busbar system for connecting devices using a contact protection integrated baseplate module.

Busbars may include one or more busbars for supplying power to electrical devices. Devices are arranged directly on the busbars or by means of adapter devices. Conventional busbar systems use busbars with a rectangular cross-section for power transmission. The busbars may be mounted inside switch cabinets. Busbars are used for single-phase or multi-phase power supply systems. For multi-phase power supply, busbars are conventionally arranged parallel to each other, with switching devices being arranged on the parallel busbars by means of latching elements or adapter devices.

With conventional busbar systems, it is necessary to adapt the power transmitting busbars in a contact protection manner by means of protective covers for a user at points where no switching device is mounted on the busbars. With conventional busbar systems, there exists therefore a considerable installation effort for a user, as not only the switching device must be mounted on the busbars, but also additional electrically insulating cover elements must be attached to the busbars to protect the user.

This is made even more difficult by the fact that, depending on the size of the switching device mounted on the busbars, there are usually no suitable, precisely fitting electrically insulating cover elements available for mounting them without gaps on the busbars. In many cases, clearances or gaps therefore remain between the switching device mounted on the busbars and the subsequently mounted insulating protective cover elements. Due to the presence of the resulting gaps, the protection against accidental contact for a user or fitter is reduced, so that there is a risk that a fitter may contact a busbar running under the insulating covers and receive an electric shock if handled carelessly.

It is therefore an object of the present invention to provide a busbar system which offers a user a higher level of operational safety and which may be easily installed.

In accordance to the invention, this object is achieved by a power busbar system with the features defined in patent claim 1.

The invention thus provides a power busbar system for connecting devices with at least one contact protection baseplate module for receiving elongated and electrically conductive power busbar modules, each of which has a plurality of uniformly spaced contact openings of a contact opening array, wherein electrical connection contacts of a device to be connected may be inserted into the contact openings of the contact opening array of the electrically conductive power busbar modules to establish an electrical and mechanical connection.

The power busbar system in accordance to the invention is particularly safe to operate, as the electrically conductive power busbar modules are protected against contact and are contained within an insulating baseplate module.

A further advantage of the power busbar system in accordance to the invention is that the devices may be attached to the contact protection baseplate module without any tools, as the devices have spring-loaded contacts that engage in the busbar modules.

A further advantage of the power busbar system in accordance to the invention is that the busbar system may be installed particularly quickly and easily, since the contact protection baseplate modules with the integrated busbars are already preconfigured and therefore the user does not have to install the individual busbar modules or busbars.

The baseplate module may be mounted on different mounting rails (flat and high version) of the switch cabinet. Due to the special design of a double-acting latching mechanism, the baseplate module may be mounted vertically and does not have to be tilted. This is particularly advantageous for a large baseplate module (e.g. 5-pole system or system with additional modules). As an additional mounting option, the baseplate module may be screwed onto a mounting plate of the switch cabinet.

In addition, the various devices to be connected, in particular switching devices, may easily be arranged directly on the contact protection baseplate module from the front and inserted vertically from the front into the power busbars provided inside the contact protection baseplate module. The devices may thus be arranged frontally on the contact protection baseplate module without tilting movement and inserted in one movement into the contact slots of the contact opening array of the electrically conductive busbar modules. Accordingly, the connected devices may easily be removed again from the baseplate module of the busbar system.

The baseplate module performs various functions. It serves as a busbar support for absorbing the forces and as a mechanical interface for fastening in the switch cabinet. It also serves as contact protection for the busbar modules. In addition, the baseplate module is used to ensure clearances and creepage distances for IEC and UL applications.

In the power busbar system in accordance to the invention, no conventional solid power busbar modules with a rectangular cross-section are used, but power busbar modules with integrated contact openings that are uniformly spaced from each other in accordance to a specified contact opening array.

In a possible embodiment of the power busbar system in accordance to the invention, the power busbar modules contained in the contact protection baseplate module comprise a U-shaped cross section with opposing side walls.

In a possible embodiment, the cross-section or cross profile of the two opposing side walls for conducting an electric current is adapted with a specified maximum current amplitude.

In a possible embodiment of the power busbar system in accordance to the invention, the two opposing side walls of the power busbar module with U-shaped cross section are connected to each other by means of a connecting web, which has contact openings of the specified contact opening array for inserting spring-loaded electrical connection contacts of a device to be connected.

In addition, the busbar module may be flat, with a one-sided wall, as a closed or open hollow profile.

In another possible embodiment of the power busbar system in accordance to the invention, the contact protection baseplate module of the busbar system is adapted to accommodate several power busbars arranged therein, each consisting of at least one power busbar module.

In another possible embodiment, the baseplate module is adapted to comprise several parts. Each part of the baseplate module may accommodate one or more busbar modules.

In another possible embodiment of the power busbar system in accordance to the invention, the electrically conductive power busbar modules are covered with at least one contact protected elongated cover module which has feed-through openings for the passage of connecting contacts, the connecting contacts for the connection of a device or a further module being insertable into the contact openings, located below the feed-through openings, of the contact-opening array of the electrically conductive power busbars. The cover module may be clipped, screwed, welded or glued to the baseplate module.

In a preferred embodiment of the power busbar system in accordance to the invention, the contact protection baseplate module has a contact protection cover plate firmly connected to the baseplate module with feed-through openings for connection contacts, the feed-through openings being located directly above the contact openings of the power busbar modules contained or integrated in the baseplate module.

In another possible embodiment of the power busbar system in accordance to the invention the baseplate module comprises on its rear side fastening means for mounting on a mounting rail or a mounting plate.

In another possible embodiment of the power busbar system in accordance to the invention, the connecting contacts of a device to be connected to the power busbar system are V-shaped or finger-shaped and may be passed through the feed-through openings of the contact protection cover plate of the baseplate module and inserted into the contact openings of a power busbar module below.

Another possible embodiment of the power busbar system in accordance to the invention comprises the contact protection cover plate of the baseplate module with coding slots for polarity reversal protection ribs for correct connection of devices onto the power busbar modules of the power busbar system.

In another possible embodiment of the power busbar system in accordance to the invention, the contact protection baseplate module contains busbar modules and electrical data lines for communication between the devices connected to the busbar system.

In another possible embodiment of the power busbar system in accordance to the invention, the devices connected to the power busbar system communicate with each other by means of Powerline communication directly by means of the power busbars contained in the contact protection baseplate module.

In another possible embodiment of the power busbar system in accordance to the invention, the devices connected to the power busbar system communicate with each other by means of a wireless radio interface.

In another possible embodiment of the power busbar system in accordance to the invention, the contact protection baseplate module comprises measuring modules for measuring current and voltage on the power busbar modules contained in the contact protection baseplate module.

In another possible embodiment of the power busbar system in accordance to the invention, the contact protection baseplate module contains, in addition to power busbar modules, electrical supply lines for the transmission of auxiliary supply voltages for measuring modules provided in the contact protection baseplate module and/or for the devices connected to the power busbar modules.

In another possible embodiment of the power busbar system in accordance to the invention, the contact protection baseplate module has mechanical connecting elements for connection to other contact protection baseplate modules.

In another possible embodiment of the power busbar system in accordance to the invention the contact protection baseplate module comprises shock-absorbing and/or vibration-absorbing connecting elements for mechanical support of connected devices.

In another possible embodiment of the power busbar system in accordance to the invention, feed-in components are attached to the contact protection baseplate module for feeding any desired cables, in particular round conductors, flat conductors, etc., into the power busbar system. These feed-in components may be located both on the front and rear side of the baseplate module. The feed-in components may be completely integrated into the baseplate module or attached to the baseplate module.

In another possible embodiment of the power busbar system in accordance to the invention, the contact protection baseplate module is made of a heat-conducting flame-retardant plastic material.

In another possible embodiment of the power busbar system in accordance to the invention, the contact protection baseplate module comprises IP20 protection against accidental contact.

In another possible embodiment of the power busbar system in accordance to the invention, the contact protection baseplate module comprises IP30 protection against accidental contact. An extension to IP40 is possible by means of additional covers.

In another possible embodiment of the power busbar system in accordance to the invention, a power supply module is provided which serves to feed various electrical current phases into the power busbars which are arranged in parallel in the contact protection baseplate module, each busbar composed of at least one power busbar module.

In one possible embodiment of the power busbar system in accordance to the invention, the power supply module comprises for each power busbar arranged in parallel in the contact protection baseplate module a contact protection connection pin with electrical connection contacts for insertion into contact openings of a power busbar module.

In another possible embodiment, the busbar system has a contact protection bridge module, wherein a contact protection bridge module of the busbar system has several connection contacts on both sides for insertion into contact openings, which are located at the ends of two elongated and electrically conductive adjacent busbar modules of a busbar of the busbar system, each covered by a contact protection cover module.

In the case of a possible implementation of this embodiment, the contact protection bridge module has feed-through openings arranged centrally on both sides for the feed-through of connection contacts which may be inserted into contact openings of the contact-opening array of the two electrically conductive busbar modules formed by the bridge module in order to connect a device to the busbar system.

In a further possible embodiment of the power busbar system in accordance to the invention, the power busbar system has a contact protection end cap module, a contact protection end cap module of the power busbar system having a plurality of connecting contacts for insertion into contact openings of the contact opening array, which connecting contacts are located at one end of an elongated and electrically conductive power busbar module of a power busbar of the power busbar system which power busbar module is covered by a contact protection cover module.

In the case of a possible implementation of this embodiment, the contact protection end cap module has centrally arranged feed-through openings for the insertion of connection contacts, which may be inserted into contact openings of the contact-opening array for the connection of a device to the busbar system, which are located below the contact protection end cap module.

Another possible embodiment of the power busbar system in accordance to the invention is a contact protection elongated cover module of the power busbar system with a recess at each of its two ends, which is provided for insertion of an end cap module, a side of a bridge module or a connecting pin of a power supply module of the busbar system into contact openings of the contact opening array of electrically conductive busbars of the busbar system in order to form in a flush manner a contact protection cover plate of the contact protection baseplate module of the busbar system.

In another possible embodiment of the power busbar system in accordance to the invention, a device to be connected to the power busbar system may be latched onto the power busbars of the power busbar system composed of the power busbar modules to establish a mechanical connection.

In another possible embodiment of the power busbar system in accordance to the invention, a device to be connected to the busbar system also has latching means which may be latched onto latching bars of the contact protection baseplate module of the busbar system running parallel to the busbars.

In another possible embodiment of the power busbar system in accordance to the invention, the latching means of the device to be connected to the power busbar system have latching lugs which, for unlocking and locking the mechanical connection, are attached to a manually operated latching carriage of the device to be connected, which is laterally displaceable relative to the power busbars of the power busbar system within a housing of the device to be connected.

In another possible embodiment of the power busbar system in accordance to the invention, the connecting contacts for establishing the electrical connection are either self-sprung or spring-loaded using copper materials with spring properties.

In another possible embodiment of the power busbar system in accordance to the invention, a device which may be connected to the busbar system by means of the connecting contacts is an electrical, electronic or electromechanical device.

In a possible embodiment of the power busbar system in accordance to the invention, the device for establishing an electrical connection with the power busbar system has electrical connection contacts and/or latching means for establishing a mechanical connection with the power busbar system and/or polarity reversal protection ribs for correct connection to the power busbar system.

In one possible embodiment of the power busbar system in accordance to the invention, a device which may be connected to the power busbar system comprises a motor control unit, a protective unit, a measuring device or an adapter unit.

In another possible embodiment of the power busbar system in accordance to the invention, the contact protection baseplate module of the power busbar system comprises first busbar modules for different phases of the power busbar system and second busbar modules for protective conductors of the power busbar system.

In another possible embodiment of the power busbar system in accordance to the invention, the first busbar modules have a U-shaped cross section with two opposing side walls, which are adapted for the electrical conduction of a current phase with predetermined maximum current amplitude.

In another possible embodiment of the power busbar system in accordance to the invention, the contact protection baseplate module is integrated in a switch cabinet housing to accommodate several devices, which are inserted into the contact openings of the contact opening array of the power busbar modules contained in the contact protection baseplate module. The baseplate module may either be an integrated, fixed component of the switch cabinet housing or may be connected to it.

The invention also provides a busbar module for a busbar system with the features specified in patent claim 27 in accordance to another aspect.

The invention therefore provides a busbar module for a busbar system, wherein the busbar module has a plurality of uniformly spaced contact openings in a contact opening array and is adapted to conduct an electrical current with a predetermined maximum current amplitude. The power busbar module may adopt various shapes, in particular it may have a U-shaped cross section.

In a possible embodiment of the busbar module in accordance to the invention, the opposing side walls of the busbar module are connected to each other by means of a connecting web which has the contact slots of the contact opening array for inserting spring-loaded electrical connection contacts of a device to be connected or of a supply module, a bridge module, an end cap module or another module of the busbar system.

In the following, possible embodiments of the various aspects of the power busbar system in accordance to the invention are explained in more detail with reference to the enclosed figures.

In the figures:

FIG. 7 shows a perspective view of a housing of a device that may be inserted into a contact protection baseplate module of the power busbar system in accordance to the invention;

FIG. 8 shows a perspective view of inserting the device shown in FIG. 7 into a contact protection baseplate module of the power busbar system in accordance to the invention;

FIG. 9 shows the device shown in FIG. 8 from the front after insertion into the contact protection baseplate module;

FIG. 18A shows the mounting of additional baseplate modules to a baseplate module;

FIGS. 20A, 20B, 20C show the integration into a small distribution board housing as a further exemplary embodiment of the power busbar system in accordance to the invention;

Figure 1:
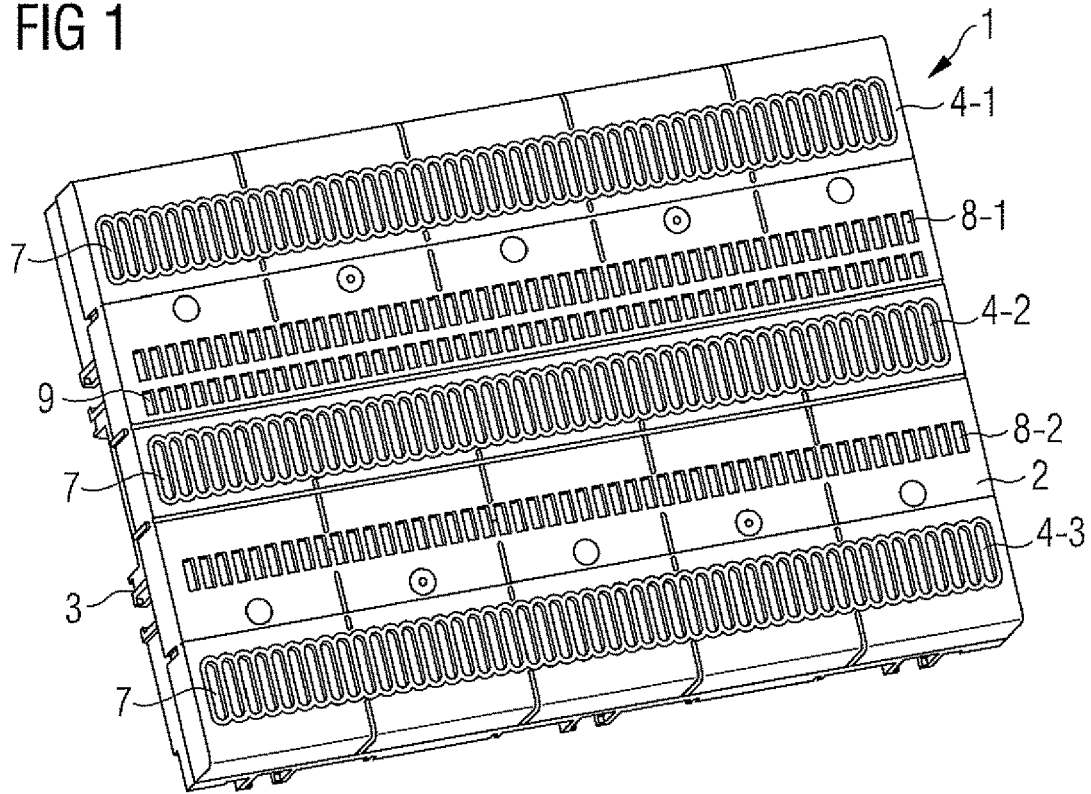
FIG. 1 shows a slightly perspective view of a possible embodiment of a contact protection baseplate module with a mounted cover module used in the power busbar system in accordance to the invention.

FIG. 1 shows an exemplary embodiment for a contact protection baseplate module 1, which may be used with the power busbar system in accordance to the invention, shown slightly in perspective. The contact protection baseplate module 1 shown in FIG. 1 consists of a cover plate 2 and a lower part 3, which are both firmly connected to each other. In a possible embodiment, the upper part or the cover plate 2 is clipped onto the lower part 3 by means of clip connections. In the case of alternative embodiments, the upper part or cover plate 2 is firmly screwed to the lower part 3. In another possible embodiment of the power busbar system in accordance to the invention, the upper part or cover plate 2 of the contact protection baseplate module 1 is firmly welded to the lower part 3 of the contact protection baseplate module 1 after manufacture. In another possible embodiment of the power busbar system in accordance to the invention, the upper part or cover plate 2 is riveted or glued to the lower part 3 of the contact protection baseplate module 1. Both the upper part 2 and the lower part 3 are made of an electrically insulating material. In a preferred embodiment, the upper part 2 and the lower part 3 are made of flame-retardant plastic. In a preferred embodiment, the electrically insulating flame-retardant plastic material of the upper part 2 and the lower part 3 of the contact protection baseplate module 1 has a relatively high thermal conductivity for dissipating heat.

With the power busbar system in accordance to the invention, it is possible to place various electrical devices 11, in particular switching devices, on the contact protection baseplate module 1 and plug them into contact openings 5 for connecting the devices. The contact protection baseplate module 1 shown in FIG. 1 serves to accommodate elongated and electrically conductive busbar modules 6, as shown in FIGS. 3A to 3D.

Figure 4A:
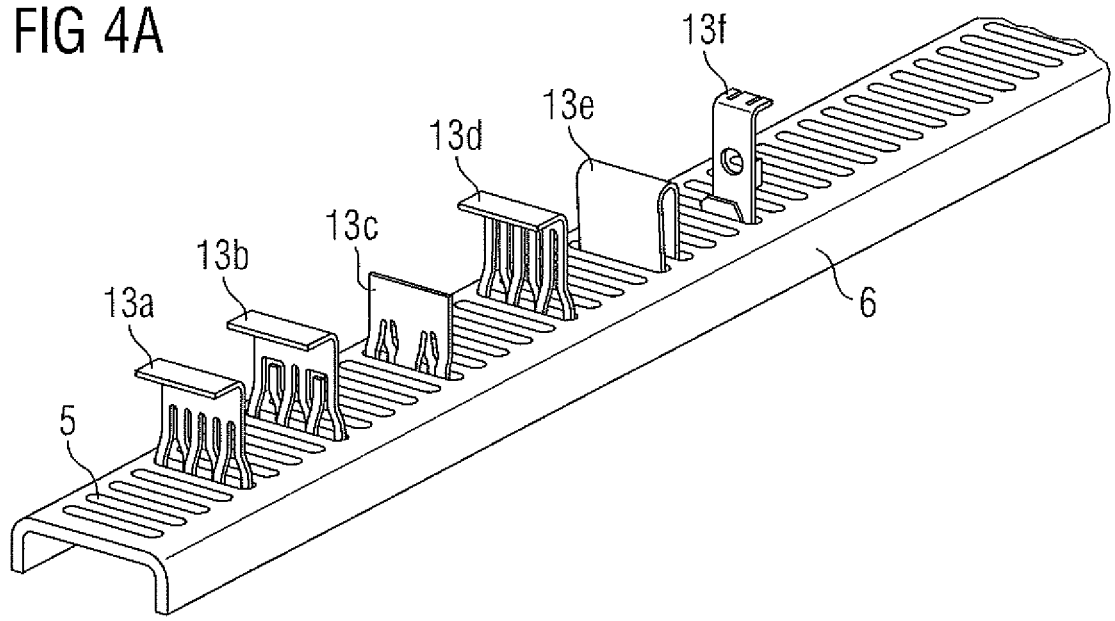
FIGS. 4A, 4B show various embodiments of electrical connection contacts for connecting electrical devices in contact slots of busbar modules, as shown in FIGS. 3A to 3D.
Figure 4B:
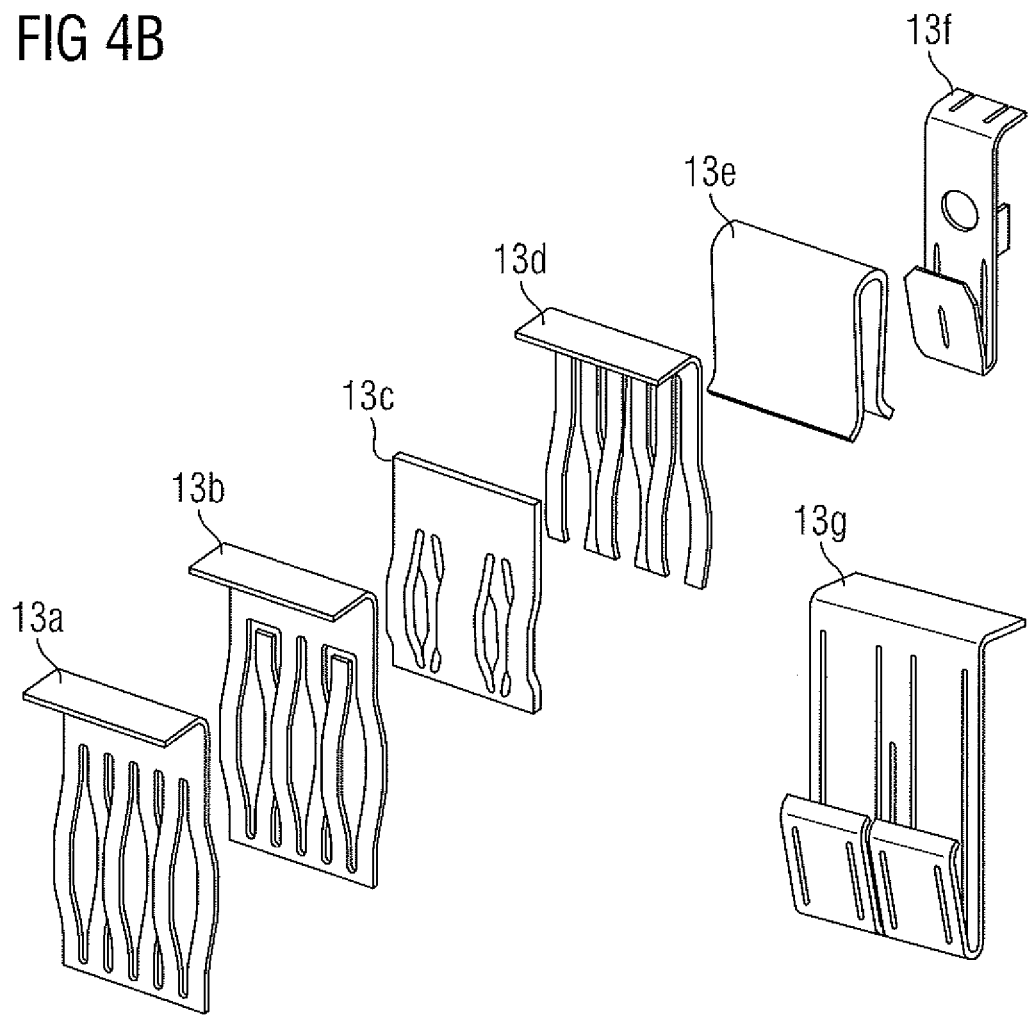

The busbar modules 6 each have a plurality of uniformly spaced contact openings 5 of a contact opening array. The electrical connection contacts 13 of a device 11 to be connected may be inserted into contact openings 5 of the contact opening array of the electrically conductive busbar modules 6 contained in the baseplate module 1 to establish an electrical connection. As may be seen in FIG. 7, the connection contacts 13 are surrounded on both sides by contact protection ribs which protect the connection contacts 13 from mechanical damage. The devices 11 to be connected include, for example, motor-protective circuit-breakers, power circuit-breakers, fuse holders, fuse switches, electronic devices or other switching devices of a power distribution system. The electrical devices 11 may be plugged directly onto the baseplate module 1 without the need for adapter devices or the like. The devices or switching devices 11 each have a housing, on the bottom side of which preferably V-shaped or finger-shaped connection contacts 13 are attached, as shown in FIGS. 4A, 4B. These connection contacts 13 are used to establish an electrical connection with the electrically conductive busbar modules 6 present within the contact protection baseplate module 1. The connection contacts 13 of the devices 11 are self-sprung in one possible embodiment. In a further possible embodiment, the connection contacts 13 of the devices to be connected 11 are spring-loaded externally.

The exemplary embodiment of a contact protection baseplate module 1 shown in FIG. 1 is configured for three parallel busbars of a busbar system. Accordingly, the front side or cover plate 2 of the contact protection baseplate module 1 comprises three rows 4-1, 4-2, 4-3 of feed-through openings 7. The connection contacts 13 of the devices 11 are adapted in such a way that they may be passed through the feed-through openings 7 of the cover plate or the upper part 2 of the contact protection baseplate module 1 and, after passing through, may be inserted into correspondingly arranged contact openings 5 of a predetermined contact opening array of the electrically conductive busbar modules 6 enclosed by the insulating contact protection baseplate module 1. Specially shaped or adapted busbar modules 6 may be used in the contact protection baseplate module 1 of the power busbar system in accordance to the invention. The electrically conductive busbar modules 6 are busbar modules with contact openings 5, i.e. the busbar modules 6 each have a plurality of uniformly spaced contact openings 5 of a specified contact opening array.

The contact openings 5 and the feed-through openings 7 are slot-shaped in one embodiment. Alternatively, the contact openings 5 and the feed-through openings 7 are circular, elliptical, square or triangular.

FIGS. 3A, 3B, 3C, 3D show various embodiments of the electrically conductive busbar modules 5, which may be used with the power busbar system in accordance to the invention. In the exemplary embodiments shown in FIGS. 3A to 3D, the contact openings 5 are slot-shaped and form contact slots.

Figure 3A:
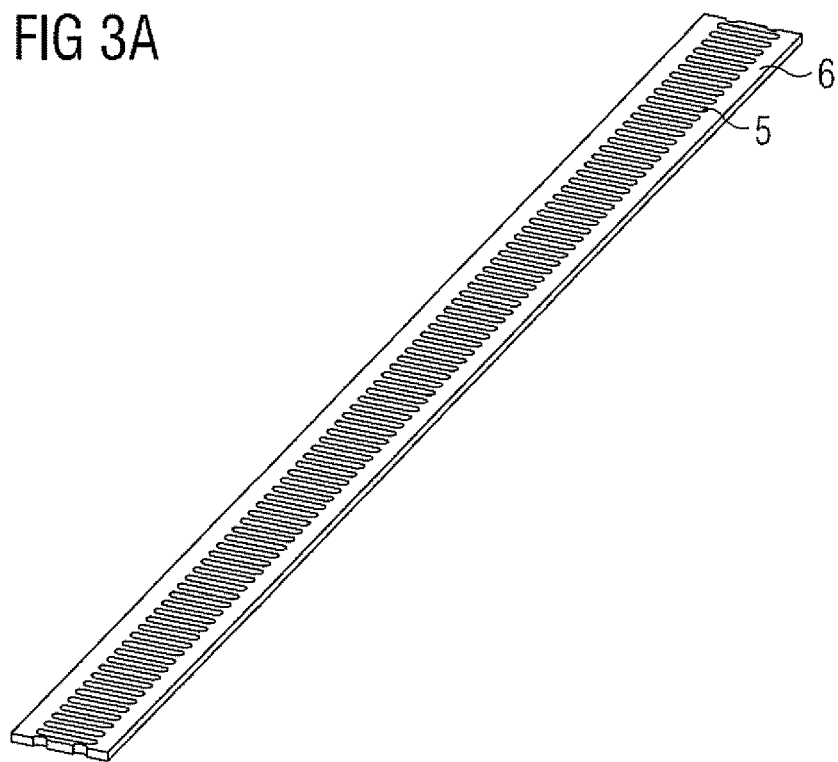
FIGS. 3A, 3B, 3C, 3D show various exemplary embodiments of possible busbar modules that may be used with the power busbar system in accordance to the invention.

FIG. 3A shows a first embodiment of an electrically conductive busbar module 6, which may be used with the power busbar system in accordance to the invention. The busbar module 6 consists of an electrically conductive material such as copper. Along the longitudinal direction of the busbar module 6 there is a plurality of contact openings 5. The contact openings 5 have a spacing of 4.5 mm from each other and are 2.2 mm wide in a possible embodiment. The contact openings 5 are contact slots in a possible embodiment, and have a slot length of approx. 15 mm in a possible embodiment. In the case of alternative embodiments, other dimensions and spacing of the contact openings 5 are possible. V-shaped or finger-shaped connection contacts 13 of different dimensions of the respective devices 11 may engage or latch into the contact openings 5 of the elongated and electrically conductive busbar module 6. The connection contacts 13 may either sample current or voltage from the power busbar 6 or feed current or voltage into the power busbar 6. In the example shown in FIG. 3A, the electrically conductive busbar module 6 is flat.

Figure 3B:
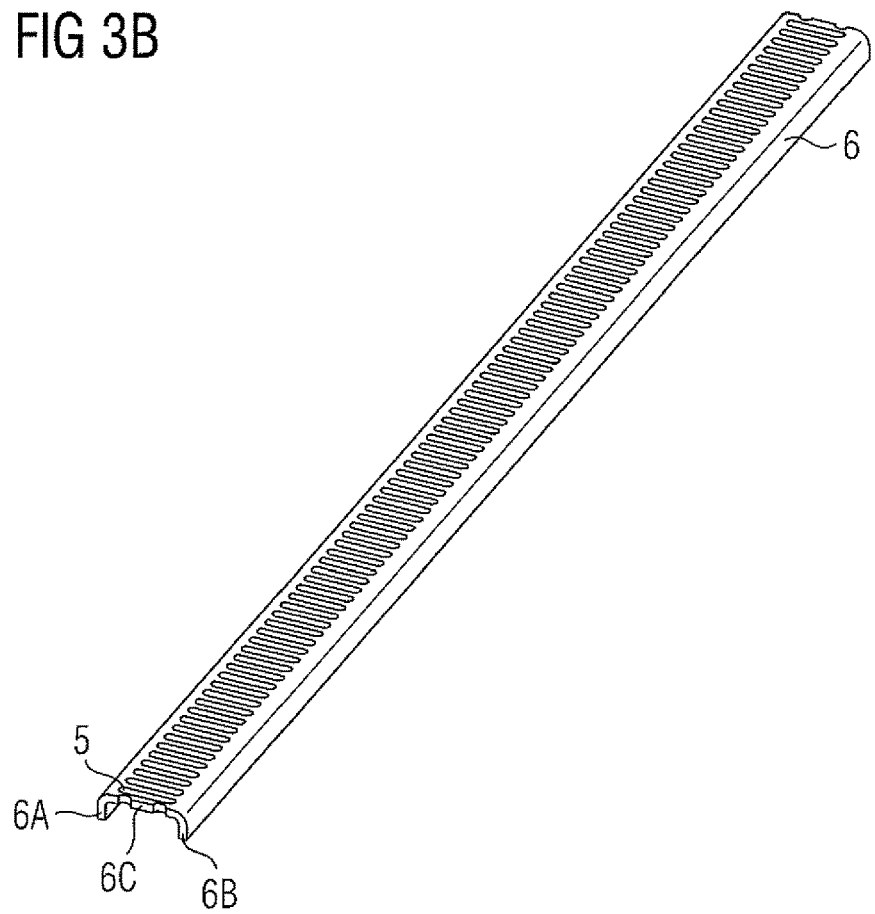

In the exemplary embodiment shown in FIG. 3B, the busbar module 6 has a U-shaped cross section, with two opposing side walls 6A, 6B being connected to each other by means of a connecting web 6C. The contact openings or contact slots 5 of the contact opening array for inserting spring-loaded electrical connection contacts of a device 11 to be connected are provided in the connecting web 6C. The U-shaped cross section with the two opposing side walls 6A, 6B is preferably adapted for conducting an electrical current with a predetermined maximum current amplitude $I_{max}$. In a possible embodiment, the maximum rated current of the power busbar system is up to approx. 250 amperes, depending on the expansion stage. The larger the cross-sectional area of the electrically conductive busbar module 6, the higher are the possible rated currents of the busbar system. The leg lengths H of the two side walls or side legs 6A, 6B of the U-shaped busbar module 6 may vary depending on the application.

Figure 3C:
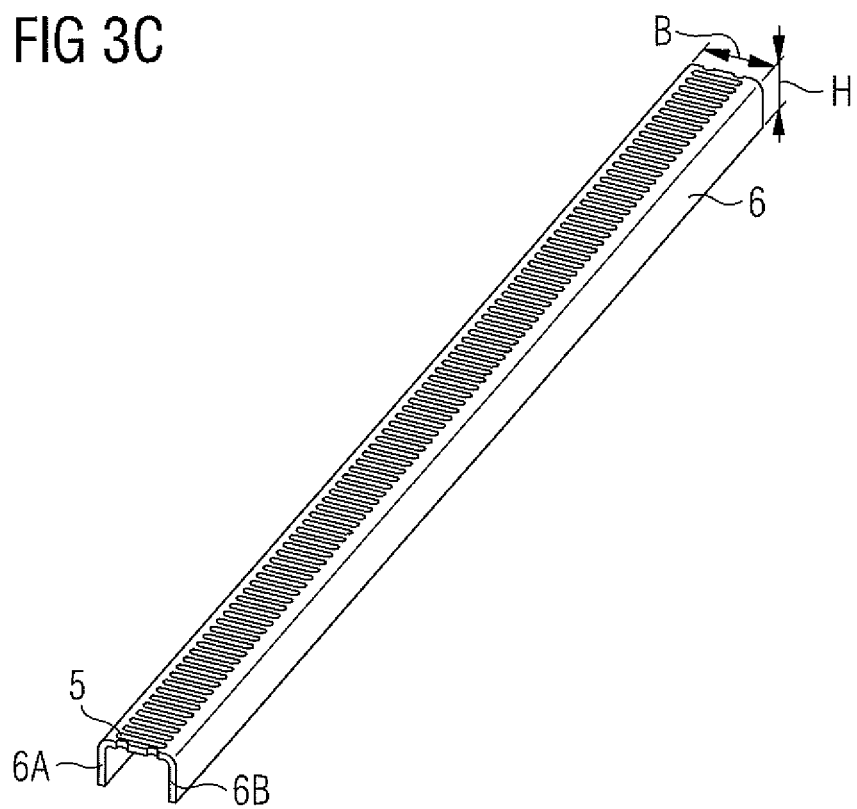

FIG. 3C shows another exemplary embodiment of an electrically conductive busbar module 6 with longer side walls or side legs 6A, 6B compared to the embodiment in FIG. 3B. The height H and the width B of the busbar module 6 with U-shaped cross-section profile may vary in different embodiments and are selected depending on the respective application or maximum rated current of the busbar system.

Figure 3D:
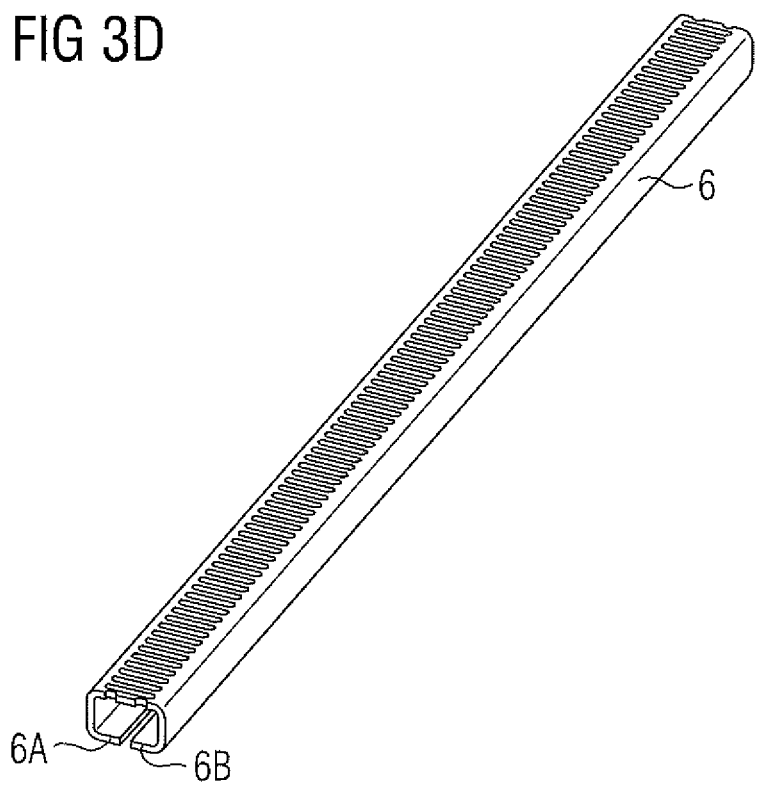

FIG. 3D shows another possible embodiment of an electrically conductive busbar module 6, as it may be used with the power busbar system in accordance with the invention. In the exemplary embodiment shown in FIG. 3D, the two ends of the two opposing side walls 6A, 6B are bent towards each other, resulting in an almost annular cross-section profile for the busbar module 6.

FIG. 4A shows a further exemplary embodiment of an electrically conductive busbar module 6 with uniformly spaced contact openings or contact slots 5, into which different types of electrical connection contacts of 13 different types of electrical devices 11 may be inserted. FIG. 4A shows six different embodiments 13a to 13f for possible electrical connection contacts 13, which may be inserted through the feed-through openings 7, in particular the feed-through slots, into the contact slots 5 of a busbar module 6.

FIG. 4B shows the different variants 13a to 13g of the electrical connection contacts 13-i in the un-inserted state.

Figure 2:
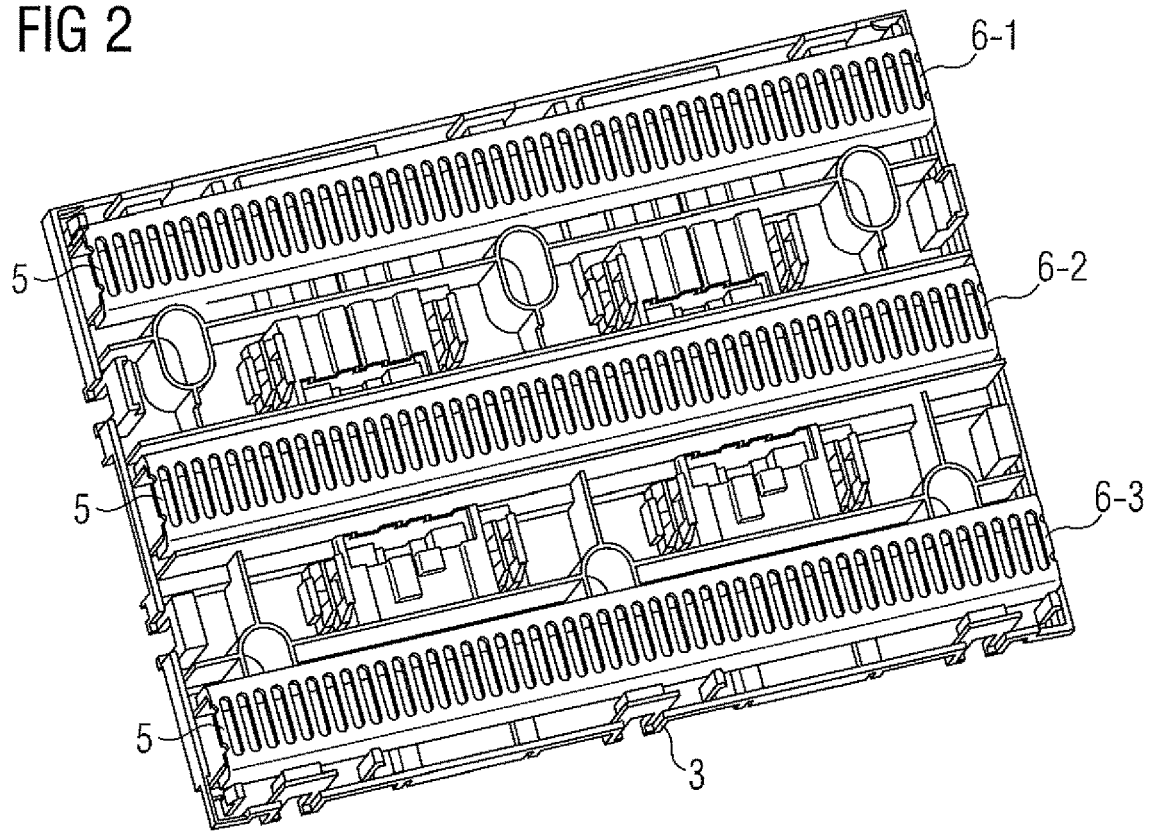
FIG. 2 shows the contact protection baseplate module with removed cover module shown in FIG. 1.

FIG. 2 shows the exemplary embodiment of a contact protection baseplate module 1 with removed cover part or cover plate 2 as shown in FIG. 1, so that the different busbar modules 6-1, 6-2, 6-3 used in the contact protection baseplate module 1 are visible. In the exemplary embodiment shown in FIG. 2, three different electrically conductive busbar modules 6-1, 6-2, 6-3 are inserted or put into the lower part 3 of the baseplate module 1. The three different electrically conductive busbar modules 6 are adapted for three different current phases L1, L2, L3 of a multi-phase power supply system. The busbar modules 6-i shown in FIG. 2 may adopt one of the cross-sectional shapes shown in FIGS. 3A to 3D. In one possible embodiment, the contact protection baseplate module 1 is pre-configured during its manufacture for the respective application of the busbar system. Suitable busbars 6-i with a suitable cross-section, which is suitable for the required rated current, and/or suitable contact opening arrays are inserted into the lower part 3 of the baseplate module 1, and then the upper part or the cover plate 2 is firmly connected to the lower part 3. In a possible embodiment of the contact protection baseplate module 1, the upper part 2 is permanently connected to the lower part 3, for example by welding, so that a user cannot remove the upper part 2 from the lower part 3 even when using a tool. In an alternative embodiment, the upper part 2 is firmly connected to the lower part 3 with a fastener or fastening means, for example screws, so that a user still has the option of removing the upper part 2 from the lower part 3 with a tool, in particular a screwdriver. With this embodiment, the user or customer has the option of exchanging the electrically conductive busbar modules 6 within the contact protection baseplate module 1 for various applications or systems.

In the exemplary embodiment shown in FIG. 2, the contact protection baseplate module 1 has several busbar modules arranged in it, wherein a busbar module 6-1, 6-2, 6-3 is provided for each current phase L1, L2, L3. In a possible embodiment, a busbar intended for one phase L of the multi-phase busbar system is formed by several busbar modules 6-i connected to each other at the end faces within the contact protection baseplate module 1. In addition, the contact protection baseplate module 1 may be connected to other contact protection baseplate modules 1 for the expansion of the power busbar system by means of mechanical connecting elements in a possible embodiment. The power busbar modules 6 contained within the various contact protection baseplate modules 1 are electrically coupled with each other in order to form a continuous electrically conductive long power busbar. The upper part or cover plate 2 faces the front in the mounting position and forms the front side for a user who inserts or removes devices 11 from the baseplate module 1.

The contact protection baseplate module 1 shown in FIGS. 1, 2 may be installed vertically or horizontally within or may be integrated into a switch cabinet. The contact protection baseplate module 1 may have standard lengths or standard dimensions, for example standard lengths of 135 mm, 225 mm, 315 mm, 405 mm or 495 mm for a possible embodiment.

As shown in FIG. 1, the top side or cover plate 2 of the contact protection baseplate module 1 has several rows 4-1, 4-2, 4-3 of feed-through openings 7 located directly above the contact openings 5 of the busbar modules 6-1, 6-2, 6-3 contained in the baseplate module 1, as shown in FIG. 2.

The lower part 3 of the contact protection baseplate module 1 preferably has fastening means on its rear side for fastening the contact protection baseplate module 1 to a mounting rail, in particular a DIN rail, and/or to a mounting plate. The power busbars are covered with the upper part 2 or a contact protection cover which has the same slot array as the slotted power busbars 6. In the upper part 2, contours or feed-through slots 7 are located in a possible embodiment with a array spacing or a contact opening array of 4.5 mm as well corresponding to the contact opening array of the underlying power busbar modules 6 contained in the contact protection baseplate module 1.

As shown in FIG. 4A, two rectangular contours or contact slots 5 of the busbar modules 6 are used for a connection contact 13 of a device 11 in a preferred embodiment, so that the device is electrically connected to the busbar system by plugging it in. In the case of the embodiments of the connection contacts 13 shown in FIG. 4A, a possible variant thereof has finger-shaped contacts which engage or engage behind two adjacent contact slots 5 of the busbar module 6. The electrical connection contacts 13-i of the electrical devices shown in FIG. 4A are thus used not only for electrical contacting of the busbar modules 6, but at the same time also for mechanical connection or mechanical support of the devices connected to the busbar system. Preferably, the mechanical fixing is carried out by contact protection ribs and the electrical connection contact 13 is thereby relieved and protected.

In the exemplary embodiment shown in FIG. 1, the contact protection baseplate module 1 has a cover plate or an upper part 2 with three parallel rows 4-1, 4-2, 4-3 of feed-through openings 7, which are used to feed through connection contacts for 13 electrical devices 11. In addition, the cover plate or upper part 2 of the contact protection baseplate module 1 in the exemplary embodiment shown in FIG. 1 has two rows 8-1, 8-2 with contours or slots which are provided for receiving interlocks of the installed devices 11 so that these may be mechanically connected to the contact protection baseplate module 1. The interlock secures the devices 11 against being pulled forward. The contact protection ribs secure the device 11 in the direction of gravity.

In addition, a further row 9 of contours or slots is provided in the embodiment shown in FIG. 1, into which so-called reverse polarity protection ribs 32 of the connected devices 11 may engage. The contours or slots of row 9 within upper part 2 of the contact protection baseplate module 1 prevent electrical devices from being plugged onto the contact protection baseplate module 1 with incorrect polarity or incorrect orientation. Due to the particular arrangement of the various feed-through slots 7, the locking contours and the reverse polarity protection contours for the reverse polarity protection ribs 32 of the devices 11, the entire contact protection baseplate module 1 may be equipped with electrical devices 11 without losing mounting space on the left or right side. With a slot spacing of 4.5 mm, for example, the following reasonable widths of the device housings result, for example 18 mm, 22.5 mm, 27 mm, 36 mm and 45 mm. The housing width of 18 mm represents a standard dimension for circuit breakers. A housing width of 22.5 mm is provided by various electronic or electrical devices 11 or modules 22, 5 and devices for feeding-in i.e. supplying electrical current. Furthermore, switching devices 11 are known with a standard device width of their housing of 27 mm, 36 mm or 45 mm or 54 mm. The device interfaces to the contact protection baseplate module 1 are preferably adapted in such a way that all devices 11 with such conventional device widths may be lined up on the contact protection baseplate module 1 with no spacing between them, so that no space is lost at the front or end of the contact protection baseplate module 1.

The contact protection power busbar system in accordance to the invention thus offers a highly integrated prefabricated power busbar system that may be assembled from contact protection baseplate modules 1, which already contains the power busbars and ensures safe contact protection. In one possible embodiment of the power busbar system in accordance to the invention, the contact protection baseplate module 1 has IP20 protection against accidental contact. In a further possible embodiment of the power busbar system in accordance to the invention, the contact protection baseplate module 1 has IP30 protection against accidental contact. An IP40 protection against accidental contact may be achieved by additional covers. The series 9 of coding slots or polarity reversal protection slots reliably prevents accidental twisting of the devices to be connected. Compared to conventional busbars, the busbar modules 6 used in the original busbar system have integrated contact openings 5, which ensure electrical contact between the devices and the busbar system. The devices may be connected to and disconnected from the busbar system without the use of any tools. If necessary, a slotted screwdriver may only be used to operate a latching element of the device.

In a possible embodiment of the power busbar system in accordance to the invention, the contact protection baseplate module 1 may have shock-absorbing and/or vibration-absorbing connecting elements for mechanical support of devices. These may be attached to the mechanical interfaces. In addition, power supply components for supplying current or voltage to the busbar system may be attached or integrated to the contact protection baseplate module 1. Furthermore, an interlock may be provided to prevent vibrations and unintentional disconnection. In another possible embodiment, a heat sink structure is provided in the plastic housing or in the contact protection baseplate module 1 for inserting cooling elements. Furthermore, the contact protection baseplate module 1 may have ventilation openings in a possible embodiment, so that air may enter or exit the contact protection baseplate module 1. Furthermore, in a possible embodiment, the contact protection baseplate module 1 has openings for cable or wire bushings.

In a possible embodiment of the power busbar system in accordance to the invention, the contact protection baseplate module 1 comprises 6 electrical data lines for communication between the devices connected to the power busbars in addition to power busbar modules. Data lines for networking may be arranged between the busbars, in which the devices are connected to each other and communicate with each other. Furthermore, special plug-in contours may be provided for contacting the data lines provided in the contact protection baseplate module 1.

In another possible embodiment of the power busbar system in accordance to the invention, the devices connected to the power busbar system communicate with each other directly by means of the power busbars 6 contained in the contact protection baseplate module 1 using Powerline Communication PLC (PowerLAN or dLAN). The devices 11 inserted into the busbars each have a transceiver for exchanging information data by means of Powerline Communication PLC by means of the electrically conductive busbar modules 6. Preferably, frequencies of frequency ranges from 50 to 500 kHz and/or from 16 MHz to 30 MHz are used for data transmission. Data rates of up to 2.5 Mbit/sec may be achieved in the lower frequency range, while up to 14 Mbit/sec may be achieved in the upper frequency range.

In another possible embodiment of the power busbar system in accordance to the invention, the devices connected to the busbar system communicate with each other by means of a separate wireless radio interface.

In another possible embodiment, communication between the connected devices takes place by means of various communication channels using electrical data lines, Powerline Communication and/or wireless communication by means of radio interfaces. The radio interfaces include a WLAN-, Bluetooth-, ZigBee- or RFID-interface, for example. Particularly in the case of radio interfaces, the devices communicate with external transmitters and receivers, such as smartphones, in order to exchange and set data and parameters.

In another possible embodiment of the power busbar system in accordance to the invention, measuring modules are provided for measuring current and voltage at the power busbar modules 6 contained in the baseplate module 1. In one possible embodiment, these measuring modules are used to detect overcurrents or short-circuits within the busbar system.

In another possible embodiment of the power busbar system in accordance to the invention, the contact protection baseplate module 1 comprises 6 electrical supply lines in addition to power busbar modules for the transmission of auxiliary supply voltages for the measuring modules provided in the contact protection baseplate module 1 or for the devices connected to the power busbar modules 6.

In a further possible embodiment, 1 cooling lines or cooling pipes are provided within the contact protection baseplate module for dissipating waste heat from the interior of the contact protection baseplate module 1, which run vertically when the baseplate module 1 is installed. In one possible embodiment, the upper part 2 and the lower part 3 of the contact protection baseplate module 1 consist of a thermally conductive plastic material for better heat dissipation. In another possible embodiment of the power busbar system in accordance to the invention, the contact protection baseplate module 1 may be extended with additional modules for neutral conductors, N- or PE-conductors or for data lines. These additional modules may be attached to the top and/or bottom of the contact protection baseplate module 1 in a possible embodiment. Special contours are provided on the baseplate module 1 for mounting. These contours are adapted in such a way that expansion with additional modules is also possible if the baseplate module 1 is already installed on a top-hat rail or a mounting plate in the switch cabinet.

In another possible embodiment of the power busbar system in accordance to the invention, the contact protection baseplate module 1 is integrated in a switch cabinet housing for accommodation of several devices 11 which are inserted into the contact slots of the contact opening array of the power busbar modules 6 contained in the contact protection baseplate module 1.

Further embodiments of the power busbar system in accordance to the invention are possible. In one possible embodiment, the busbar system has a modular structure. In a possible embodiment, the busbar system has at least one power supply module, which is intended for feeding various electrical phases L of current into the busbar system. The power supply module feeds various electrical current phases L into the power busbars arranged in parallel in the contact protection baseplate module 1, each consisting of at least one power busbar module 6. The power supply module may have a contact protection connection pin with electrical connection contacts for insertion into contact slots of a power busbar module 6 for each power busbar arranged in parallel in the contact protection baseplate module 1 in a possible embodiment. Furthermore, the busbar system of a modular design may include contact protection bridge modules. A contact protection bridge module of the busbar system has several connection contacts on both sides for insertion into contact openings 5, which are located at the ends of two elongated and electrically conductive adjacent busbar modules 6, each covered by a cover module, of a busbar of the busbar system. The contact protection bridge module preferably has feed-through openings 7 arranged centrally on both sides for passing through of connection contacts 13 of devices which may be inserted into contact openings 5 of the contact opening array of the two electrically conductive busbar modules 6 composed by the bridge module for connecting the device to the busbar system. Furthermore, the power busbar system of the modular version may include contact protection end-cap modules. A contact protection end-cap module of the busbar system has several connection contacts for insertion into contact openings 5 of the contact-opening array, which are located at one end of an elongated and electrically conductive busbar module of a busbar of the busbar system, which busbar module is covered by a contact protection cover module. The contact protection end-cap module preferably has centrally arranged feed-through openings 7 for passing through connection contacts which may be inserted into contact openings 5 of the contact-opening array below the contact protection end-cap module for connecting a device to the busbar system. In the modular version, the busbar system has contact protected elongated cover modules. The contact protected, elongated cover module of the busbar system preferably has a recess at each of its two ends, which is provided to insert in a flush manner an end-cap module, one side of a bridge module or a connecting pin of a power supply module of the busbar system into contact openings 5 of the contact opening array of electrically conductive busbars 6 of the busbar system in order to form a contact protection cover plate of the contact protection baseplate module 1.

In the case of another possible embodiment of the power busbar system in accordance to the invention, a device 11 to be connected to the power busbar system may be latched onto the power busbars of the power busbar system composed of the power busbar modules 6 in order to establish a mechanical connection. In one possible embodiment, the device to be connected to the busbar system has additional latching means which may be latched onto the latching webs of the contact protection baseplate module 1 of the busbar system running parallel to the busbars 6. The latching means of the device 11 to be connected to the busbar system have latching lugs, in a possible embodiment, which are attached to a manually operated latching means of the device 11 to be connected for unlocking and locking the mechanical connection, the latching means being laterally displaceable with respect to the busbars of the busbar system within a housing of the device 11 to be connected. Device 11, which may be connected to the busbar system, is an electrical, electronic or electromechanical device which has electrical connection contacts for establishing an electrical connection with the busbar system and latching means for establishing an additional mechanical connection. Furthermore, polarity reversal protection ribs may be provided on the housing of the electrical device 11 for a correct connection to the busbar system.

In accordance to a further aspect, the invention thus provides a device 11, in particular a switching device, such as for example a motor-protective circuit-breaker or a circuit-breaker, which may be used for a power busbar system in accordance with the invention and preferably has a housing which has suitable electrical connection contacts 13 which may be inserted into the contact openings 5 of the contact-opening array.

The device 11 in accordance with the invention has, in the case of a possible embodiment, additional polarity reversal protection ribs 32 on its housing 12, which prevent faulty insertion or connection to the busbar system. The device 11 in accordance to another possible embodiment of the invention comprises an additional mechanical latching means 16 for establishing a mechanical connection with the busbar system. In a possible embodiment, the device 11 that may be connected may be a motor control unit, a protective device, a measuring device, an adapter unit or any other device. In another possible embodiment of the power busbar system in accordance to the invention, the contact protection baseplate module 1 of the power busbar system has first busbar modules for different current phases L of the power busbar system and second differently adapted busbar modules for protective conductors P, N of the power busbar system. The first busbar modules for the current phases L preferably have a U-shaped cross section with two opposing side walls, which are adapted for the electrical conduction of a current phase L with a specified maximum current amplitude.

In another possible embodiment of the power busbar system in accordance to the invention, the contact protection baseplate module 1 may be integrated in a small distribution board housing. In one possible embodiment, the lower part 3 of the contact protection baseplate module 1 is integrated into the small distributor housing. In another possible embodiment, the entire contact protection baseplate module 1 is integrated into the small distributor housing or attached to it. Power may be fed into the busbar system from the front of baseplate module 1 or from the rear of baseplate module 1. This also applies to baseplate modules that are not integrated into a small distribution board housing.

Figure 5:
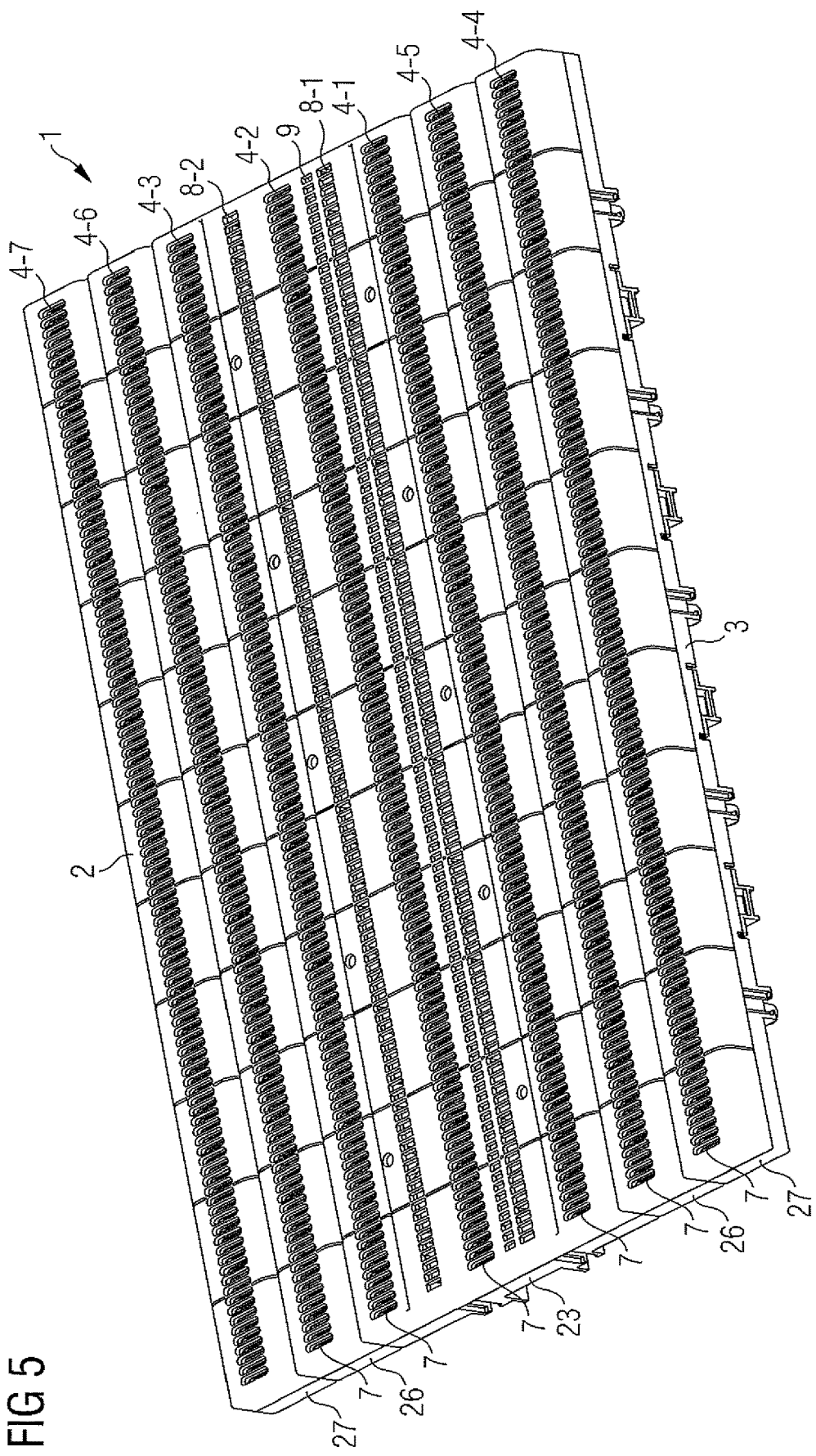
FIG. 5 shows a perspective view of an embodiment of a contact protection baseplate module used in the power busbar system in accordance to the invention.
Figure 19A:
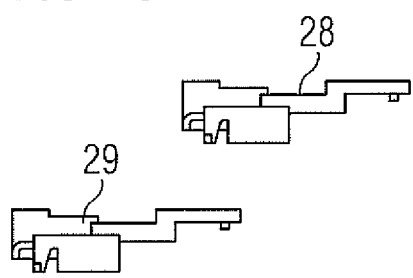
FIGS. 19A, 19B, 19C show the mounting of further additional modules and the special feature of the extension of the latching elements.
Figure 19B:
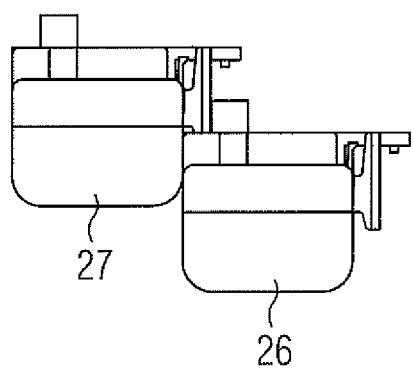
Figure 19C:
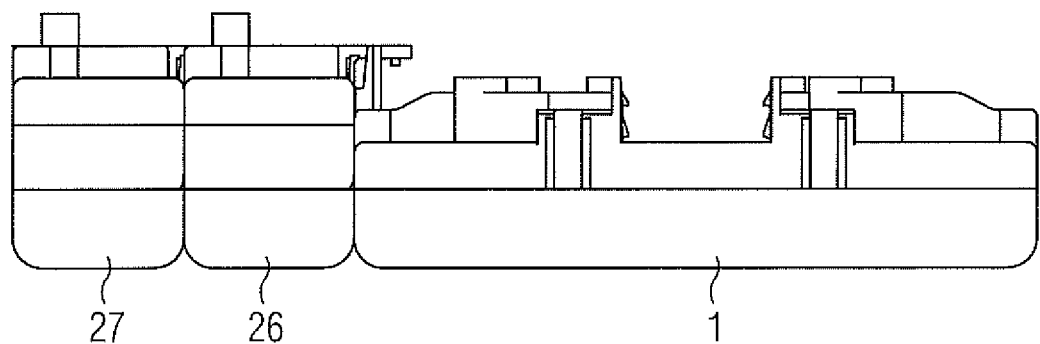

FIG. 5 is a perspective view of another exemplary embodiment for a contact protection baseplate module 1, as it may be used with the power busbar system in accordance to the invention. In the exemplary embodiment shown in FIG. 5, the contact protection baseplate module 1, similar to the baseplate module shown in FIG. 1, has a central or centrally arranged core component whose rear side or rear part 3 has mechanical fastening means for fastening to a mounting rail or a mounting plate. In the example shown, the contact protection baseplate module 1 has three parallel rows 4-1, 4-2, 4-3 in the center with a plurality of uniformly spaced feed-through openings 7, under each of which there is an associated contact opening 5 of the same shape in the contact opening array. Further rows 4-4, 4-5, 4-6, 4-7 with feed-through openings 7 are provided at the top and bottom, under which busbar modules 6 with correspondingly spaced contact openings 5 of the contact opening array are also located. In the exemplary embodiment shown in FIG. 5, the contact protection baseplate module 1 thus contains a total of seven parallel busbars integrated in it. In one possible embodiment, the two upper busbar modules or busbars and the two lower busbar modules or busbars are contained in separate additional modules 26, 27, which are mechanically connected to a central contact protection baseplate module 1, as shown in FIG. 1, for example. The attachment of additional modules or crossbars 26, 27 is shown in FIGS. 19A, 19B, 19C. The example shown corresponds to a baseplate module 1 with four additional modules 26, 27. As may be seen in FIG. 5, the busbar system may thus be easily extended by additional modules 26, 27 for further busbars. The number of busbars provided in parallel in the additional modules 26, 27 may vary for different embodiments of the busbar system. The additional modules 26, 27 may also be mounted or latched on when the baseplate module 1 is installed.

Figure 6:
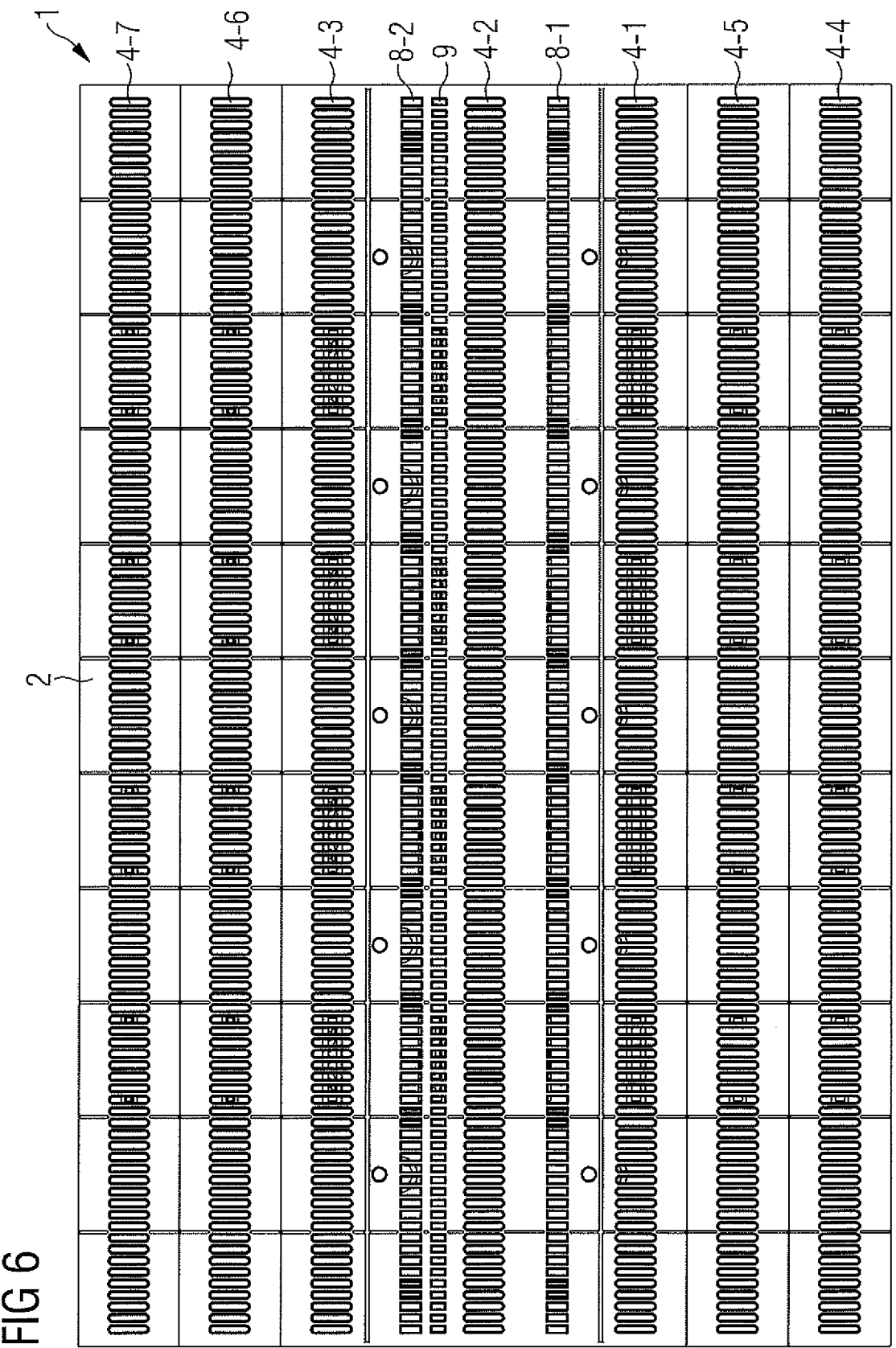
FIG. 6 shows a front view of the contact protection baseplate module shown in FIG. 5.

FIG. 6 shows a front view of the upper part 2 of the exemplary embodiment of a baseplate module 1 shown in FIG. 5.

FIG. 7 is a perspective view of an exemplary embodiment for a device 11 that may be connected to the busbar system. Device 11 has a specially shaped housing 12, on the bottom side of which there are plug contacts 13-1, 13-2, 13-3 suitable for the contact slots for three current phases L1, L2, L3. A connection contact 13 is always protected by two contact protection ribs. However, two or three adjacent plug contacts are also possible for each phase. These are protected with contact protection ribs, as shown schematically in FIG. 4A. The connection contacts 13-i of device 11 attached to the bottom side of the housing 12 of device 11 are adapted in accordance to one of the six embodiments shown in FIG. 4A for a possible embodiment. In the exemplary embodiment shown in FIG. 7, the device 11 has three connection contacts 13-1, 13-2, 13-3 for three current phases L1, L2, L3. With alternative embodiments, the device 11 may have a different number of connection contacts 13 for current phases and/or neutral conductor.

FIG. 8 is a perspective view of inserting the device 11 shown in FIG. 7 into three corresponding rows 4-1, 4-2, 4-3 of a contact protection baseplate module of the power busbar system in accordance to the invention. The device may be easily arranged on the upper part 2 of the contact protection baseplate module 1 and then inserted into the contact protection baseplate module 1 with relatively little effort. For this purpose, the connection contacts 13-1, 13-2, 13-3 are fed through the feed-through openings 7 of the connection contact rows 4-i and then inserted into the contact openings 5 of the three power busbar modules 6 contained in the baseplate module 1 directly below, so that an electrical connection is established.

FIG. 9 shows the electrical device 11 with its housing 12 inserted on the contact protection baseplate module 1 from the front.

Figure 10A:
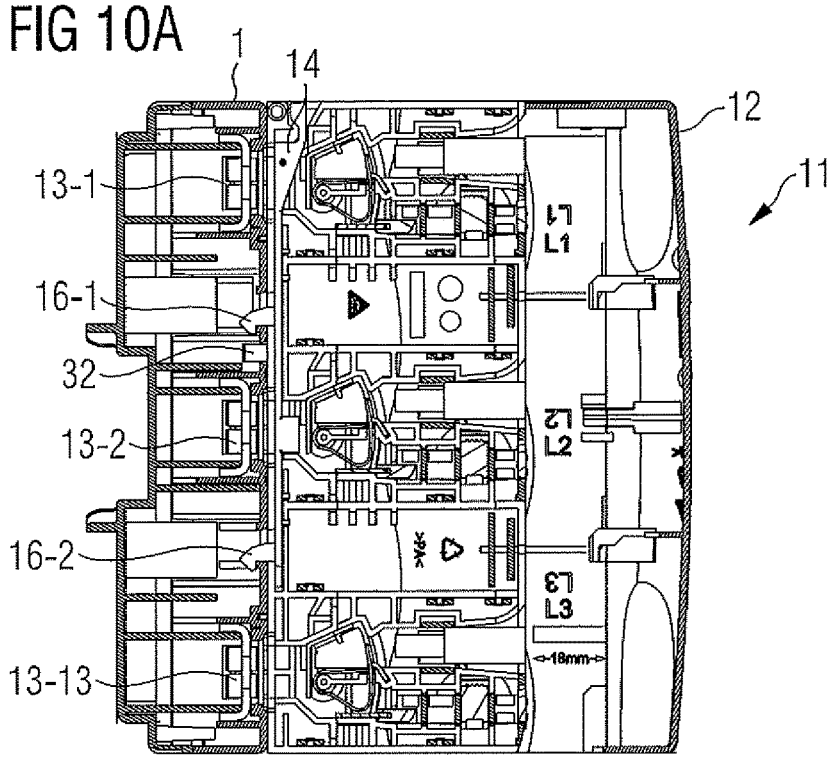
FIGS. 10A, 10B show a cross-sectional view of the device shown in FIGS. 7, 8, 9 to illustrate an exemplary embodiment of the power busbar system in accordance to the invention.
Figure 10B:
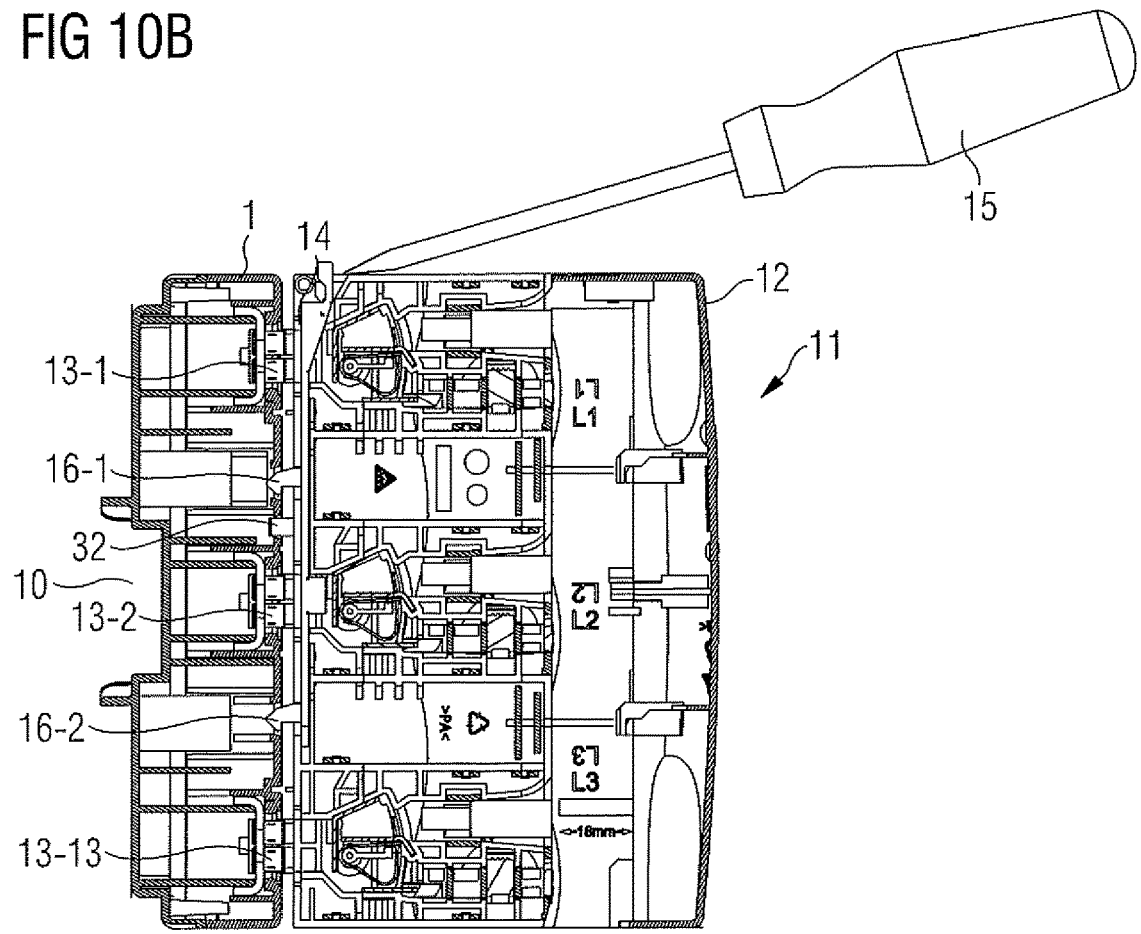

FIGS. 10A, 10B show sectional views through the housing 12 of device 11 to show an embodiment of device 11. In the embodiment shown in FIGS. 10A, 10B, device 11 has a latching element 14. FIG. 10A shows the latching element 14 in the locked or latched state. Using a tool 15, for example a screwdriver, the latching element 14 of the unit 11 may be moved to remove the unit 11 from the contact protection baseplate module 1. Furthermore, as shown in FIG. 10A, the device 11 has latching lugs 16-1, 16-2 on the bottom side of its housing 12, which engage behind the cover plate 2 of the baseplate module 1 in the locked state. In another possible embodiment, the latching lugs 16-1, 16-2 may also engage in latching webs of the contact protection baseplate module 1. Using the screwdriver 15, the latching element 14, as shown in FIG. 10B, is levered upwards so that the latching lugs 16-1, 16-2 are released from the cover and/or the latching rails of the baseplate module 1 and the device 11 may be removed from the contact protection baseplate module 1. The device 11 may be pushed onto the baseplate without actuating the latching element 14 (latching element position as shown in FIG. 10A). The latching element 14 in device 11 has an external or internal spring action which ensures that the latching element 14 is always pressed into the position as shown in FIG. 10A. Only to remove the device 11, the latching element 14 must be pulled upwards with a slotted screwdriver 15. With this embodiment, a mounted device 11 may only be removed from the contact protection baseplate module 1 after the latching element 14 has been actuated. This may safely prevent unintentional detachment of a device 11 from the contact protection baseplate module 1.

Figure 11:
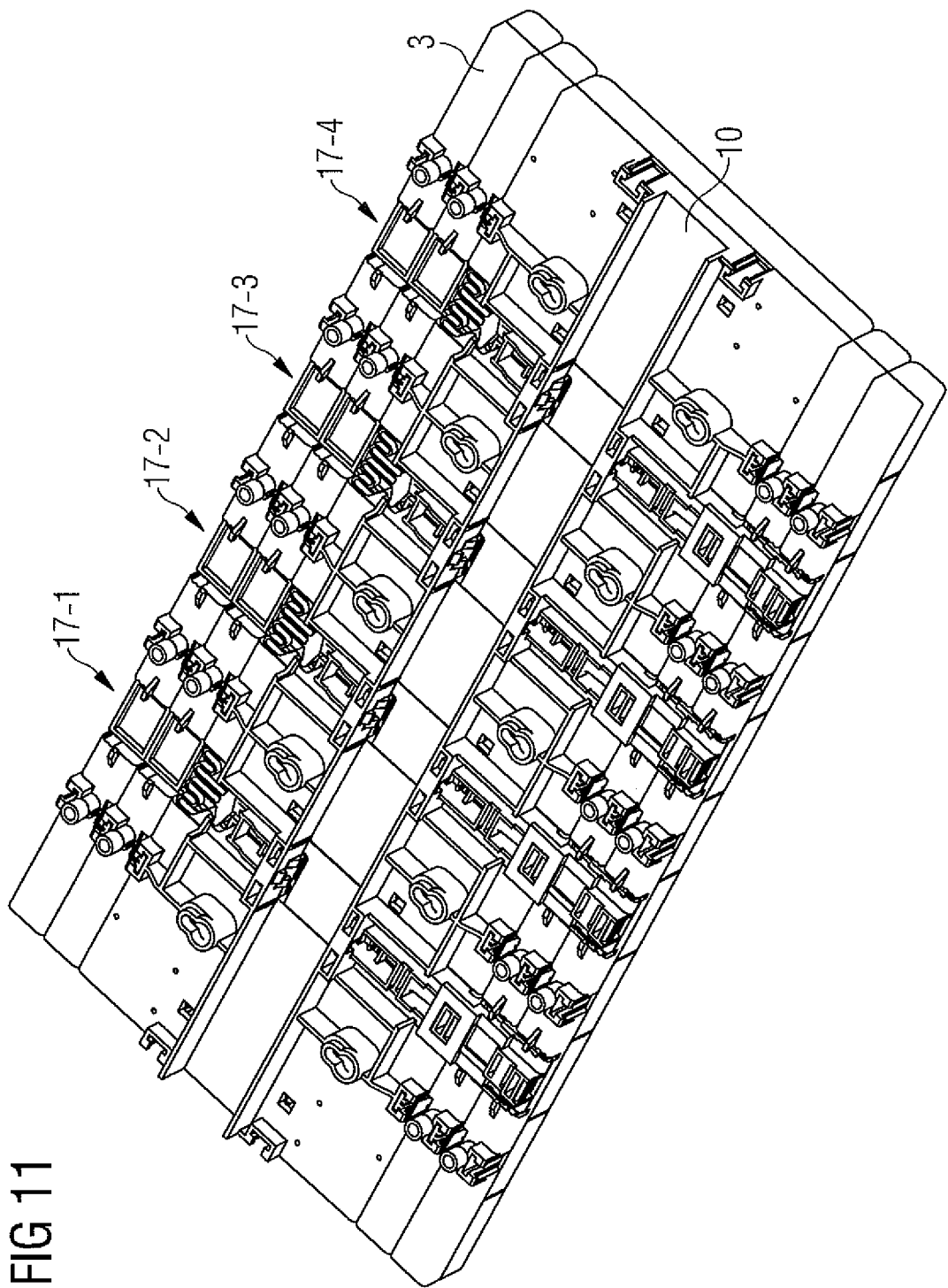
FIG. 11 shows a perspective view from the rear of a possible embodiment of a contact protection baseplate module of the busbar system, with two further baseplate modules each latched on at the top and bottom.

FIG. 11 shows a perspective view of the lower part 3 of the contact protection baseplate module 1 from the rear or from the backside. The lower part 3 of the baseplate module 1 has a recess or contour 10 for placing the contact protection baseplate module 1 on a mounting rail 23. This recess runs centrally in the center in the longitudinal direction of the baseplate module 1, as shown in FIG. 11. The baseplate module 1 may be arranged on a mounting rail, in particular a top-hat rail, and then latched onto the mounting rail. For this purpose, the lower part 3 of the contact protection baseplate module 1 has several latching elements 17, as shown in FIG. 11. In the embodiment shown in FIG. 11, the contactless baseplate module 1 has four latching elements 17-1, 17-2, 17-3, 17-4 provided for a mounting rail 23 on its backside.

Figure 12:
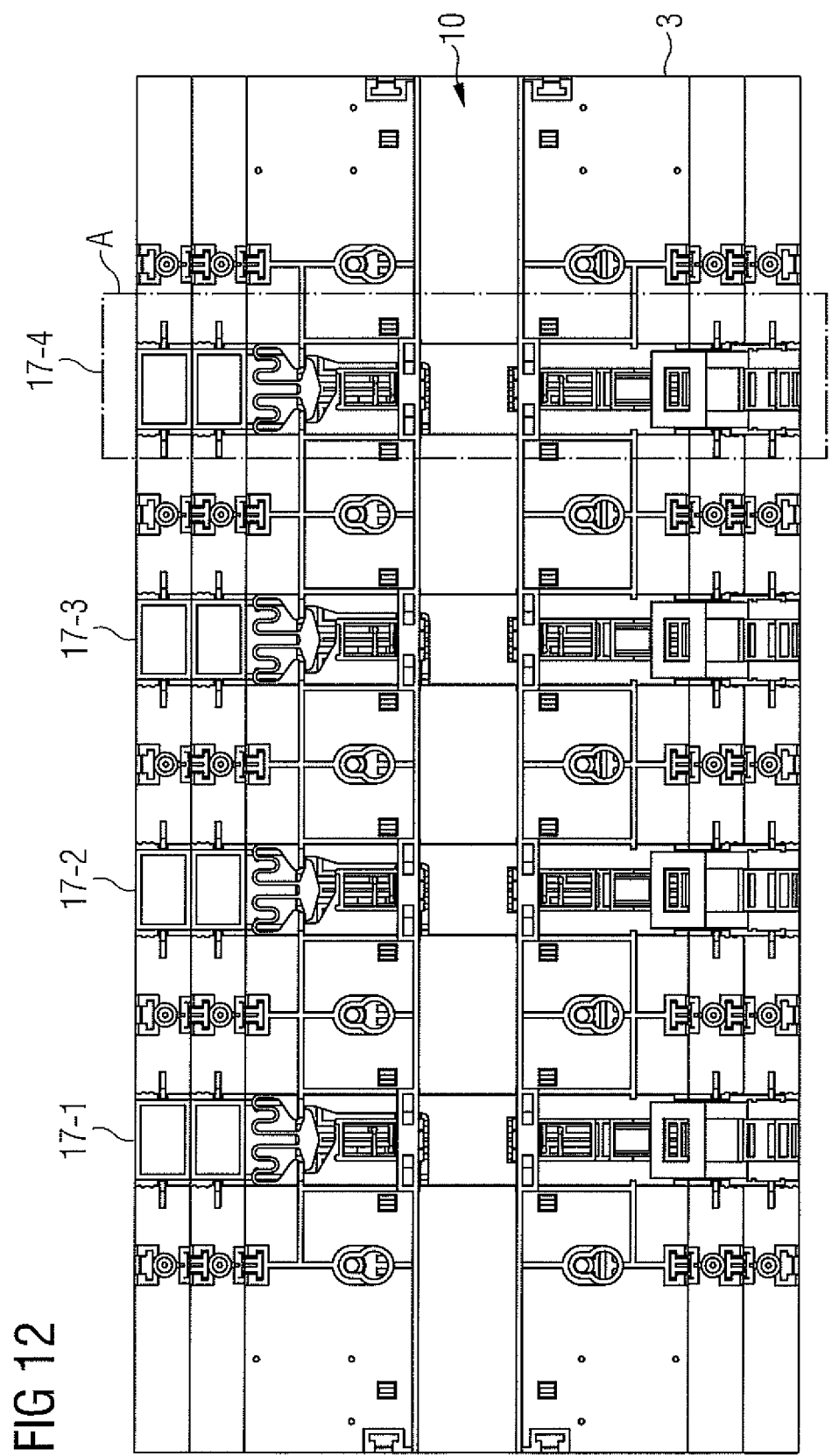
FIG. 12 shows a front view of an exemplary embodiment of a contact protection baseplate module from the rear, with two further baseplate modules each latched into place at the top and bottom.
Figure 13:
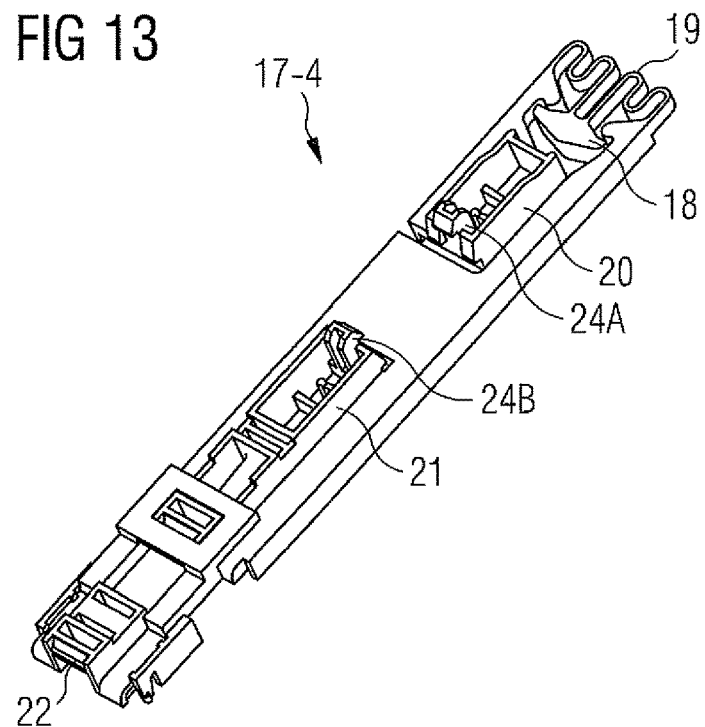
FIG. 13 shows a section of a latching element attached to the contact protection baseplate module in accordance with FIG. 12, with extensions already attached to the latching element which are necessary for the two further baseplate modules.

FIG. 12 shows a rear view of the lower part 3 of a contact protection baseplate module 1. Four adjacent latching elements 17-i are visible, which form fastening means 10 for latching onto a mounting rail 23, in particular a top-hat rail. FIG. 12 shows a basic module with four additional modules. The latching element is extended with extension elements. FIG. 13 shows a perspective view of the latching element 17-4 shown in FIG. 12, which is identical to the other three latching elements 17-1, 17-2, 17-3, with extension elements of the latching element.

Figure 14:
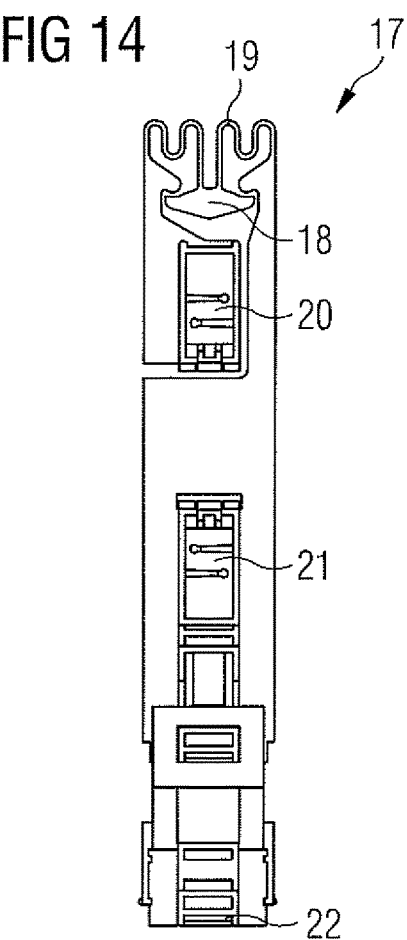
FIG. 14 shows the latching module shown in FIG. 13 from the rear.
Figure 15D:
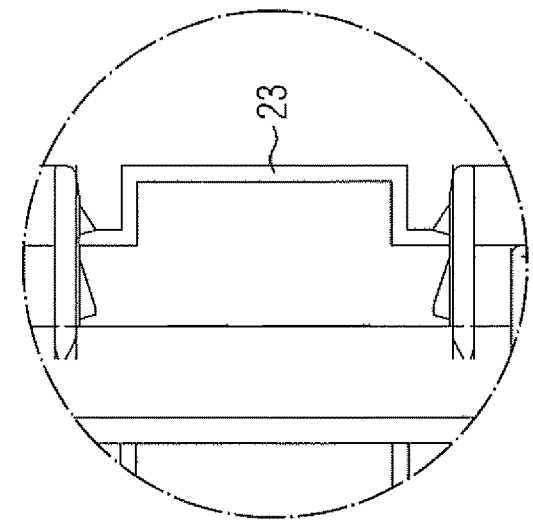
FIGS. 15A, 15B, 15C, 15D show a possible mounting of a contact protection baseplate module on a mounting rail using the latching elements shown in FIGS. 12, 13, 14.
Figure 15A:
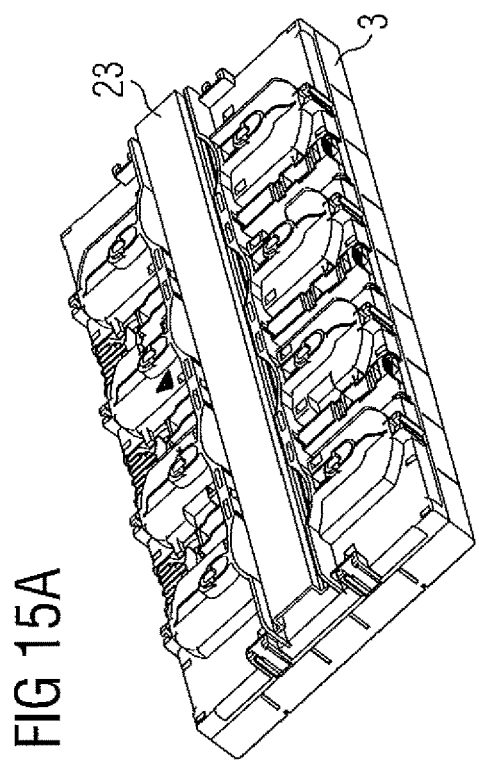
Figure 15C:
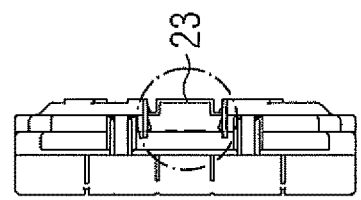
Figure 15B:
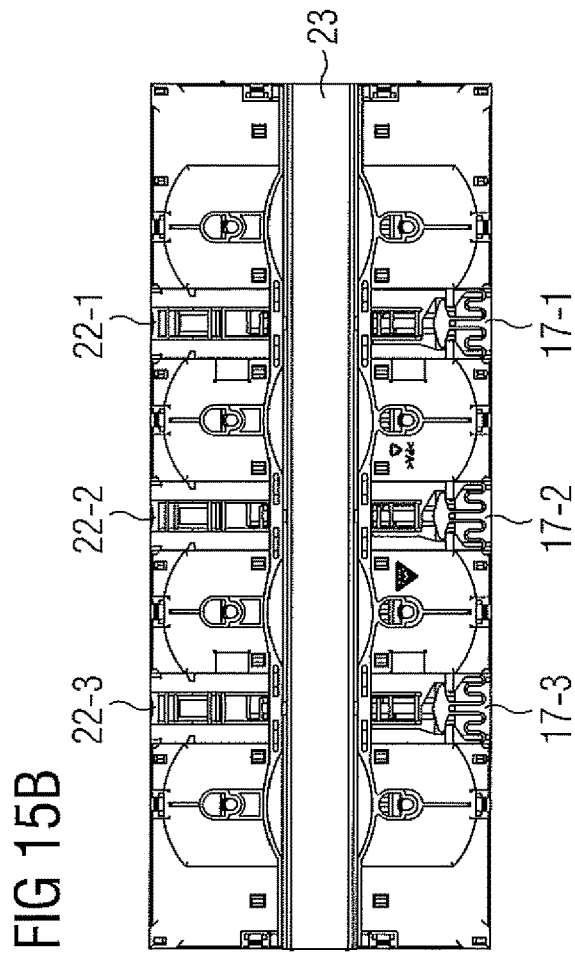

FIG. 14 shows a rear view of the latching element 17-i shown in FIG. 13. The latching element 17, which is used for mounting the contact protection baseplate module 1 to a mounting rail, has a deflection lever 18, which is molded onto the latching element 17 by means of a meander-shaped connection 19 and has a central support point. The latching element 17 also has integrated return springs 20, 21. Alternatively, external spring action by compression springs is also possible. Furthermore, the latching element 17 has an operating point 22 for operation by a user or operator. The latching element 17 is adapted in such a way that the deflection lever 18 injected onto the latching element 17 deflects an operating movement from one side in such a way that both top-hat rail latches are released from the relevant top-hat rail. The deflection lever 18 is mounted on a rotation axis. Latching hooks 24A, 24B are provided on the latching element which, when locked, engage behind the top-hat rail or mounting rail 23 so that the contact protection baseplate module 1 may no longer be removed from the mounting rail or top-hat rail 23. If the latching element 17 is operated or pulled in area 22 with a screwdriver, the formed-onto latching hook 24B moves uniformly downwards and at the same time the deflection lever 18 is rotated out of the symmetrical central position shown in FIG. 14 around the axis of rotation, wherein the other latching hook 24A moves in the opposite direction, so that the contact protection baseplate module 1 may be removed from the top-hat rail or mounting rail 23. If the latching element is pulled further, the latching element latches into a parking position so that the user must actively push the latching elements back into the locked position when re-assembling. The fasteners 10 formed by the latching elements 17-i may be easily operated by a user by actuating the operating points 22 on the edge of the contact protection baseplate module 1. One advantage of the double-sided latching element is that the baseplate module 1 may be mounted frontally on the top-hat rail without tilting. This means that even very tall baseplate modules 1 may be mounted without any problems.

FIGS. 15A, 15B, 15C, 15D show a contact protection baseplate module 1 mounted on a mounting rail 23 from the rear and from the side. In the exemplary embodiment shown in FIGS. 15A, 15B, 15C, 15D, the baseplate module 1 has three latching elements 17-1, 17-2, 17-3. In the exemplary embodiment shown in FIG. 15, the operating points 22 of the latching elements 17-i are provided at the upper edge of the contact protection basic module 1. Depending on the environment and context, the contact points 22 of the latching elements 17-i may be provided at the upper or lower edge of the contact protection basic module 1 for easy operation by a user. The latching elements 17-i allow for the contact protection baseplate module 1 to be mounted frontally on the mounting rail 23 without tilting and removed again. The latching elements 17-i may be operated with or without the use of a tool. The mounting rails 23 may have different mounting rail heights in different embodiments. The advantage of operating the latching elements 17-i is that they may be operated without dismantling devices or -products from the contact protection baseplate module 1. In a possible embodiment, the latching function of the latching elements 17-i has a parking position. The mounting rail 23 is gripped on both sides by the latching elements 17-i in the latched state. The direction of movement of the latching lugs is preferably deflected by a tilting mechanism of the latching element 17. In a possible embodiment, the operating function is transferred on to the respective additional element when the contact protection baseplate module 1 or crossbars are inserted. The number of latching elements 17 required depends on the size or length of the contact protection baseplate module 1 and the size or weight of the devices 11 mounted or mountable on it. The more devices 11 are to be mounted on the baseplate module 1 and the higher their expected weight, the greater the number of latching elements 17-i mounted on the rear side of the contact protection base module 1.

Figure 16:
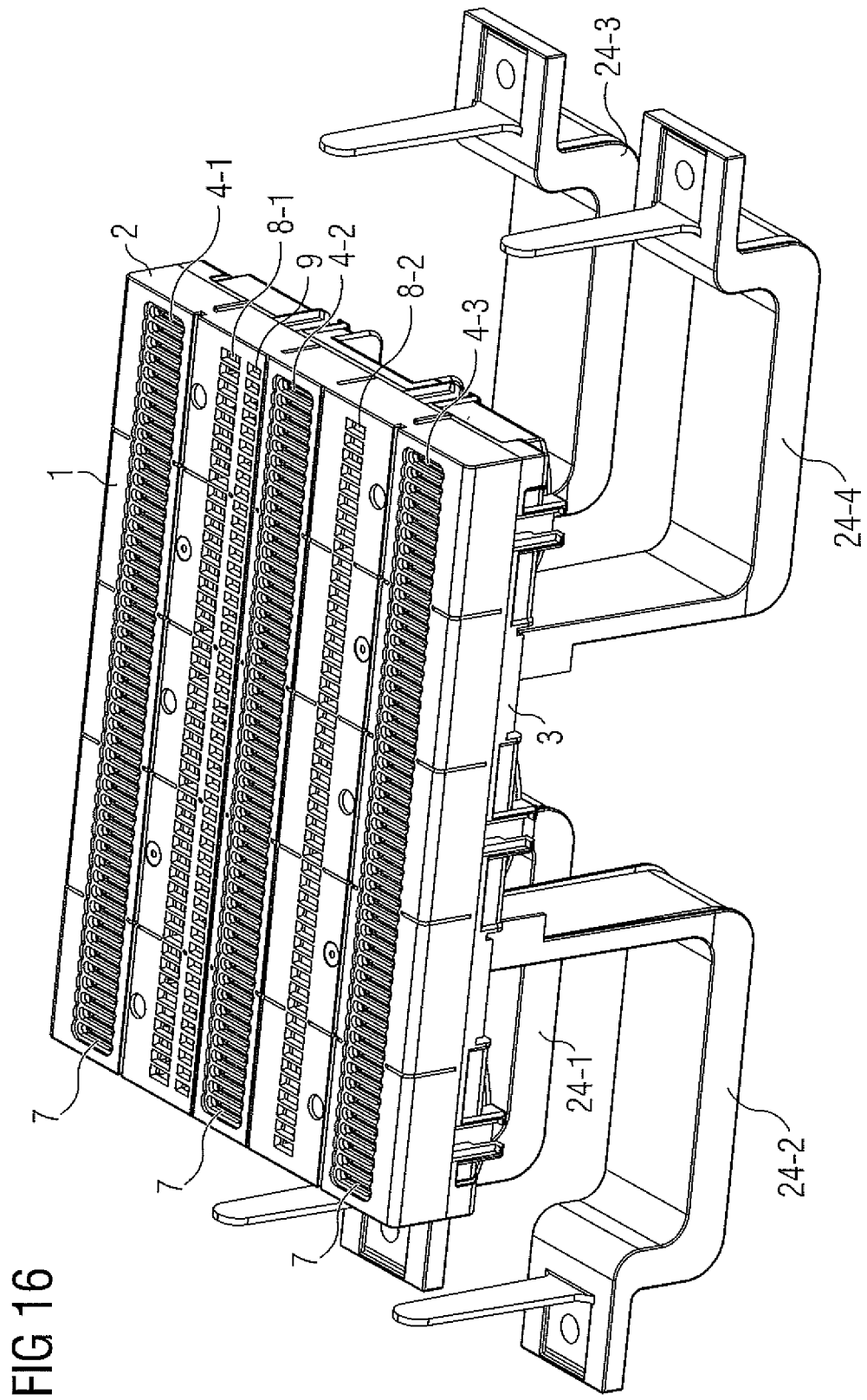
FIG. 16 shows a particular application of the baseplate module on a Lütze fastening system.

FIG. 16 shows another exemplary embodiment of the contact protection baseplate module 1 as it may be used with the power busbar system in accordance to the invention. FIG. 16 shows the mounting of the baseplate module 1 on a mounting system from Lütze.

Figure 17A:
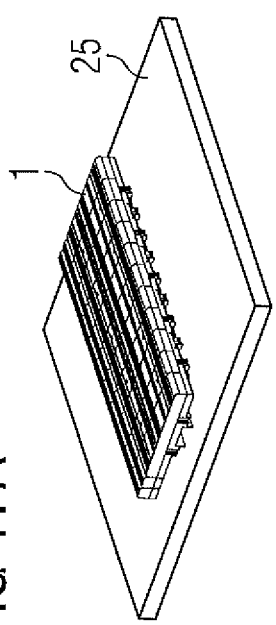
FIGS. 17A, 17B, 17C, 17D, 17E show an exemplary embodiment of the power busbar system in accordance to the invention in which a contact protection baseplate module is mounted on a mounting plate, wherein two further baseplate modules are also shown here.
Figure 17E:
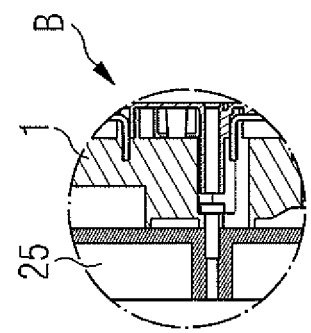
Figure 17D:
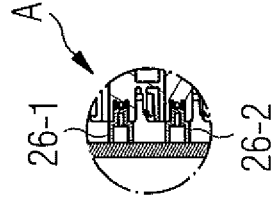
Figure 17C:
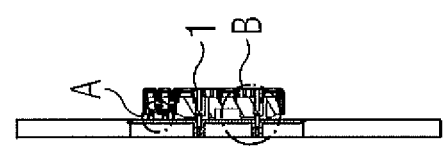
Figure 17B:
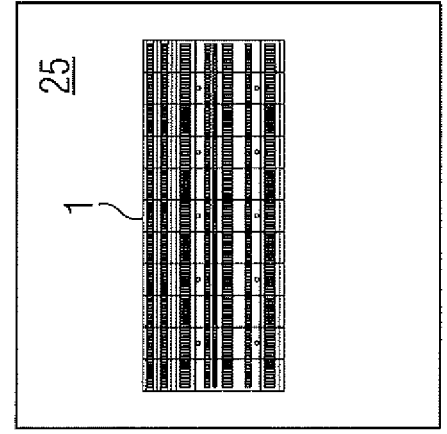

FIGS. 17A, 17B, 17C, 17D show a further embodiment of the contact protection basic module 1, as it may be used with the power busbar system in accordance to the invention. In the embodiment shown in FIGS. 17A to 17D, the contact protection basic module 1 is mounted on a mounting plate 25. FIG. 17A is a perspective view of a contact protection baseplate module 1 which is mounted on a mounting plate 25. FIG. 17B shows a front view of the mounted contact protection baseplate module 1, which is located on the mounting plate 25. FIG. 17C shows a sectional view of the mounted contact protection baseplate module 1. FIGS. 17D, 17E show detail views A, B from the sectional view in FIG. 17C. As may be seen from FIG. 17D, several additional support column elements 26-1, 26-2 may additionally support the contact protection baseplate module 1 on the mounting plate 25 in one possible embodiment. FIG. 17E shows how the contact protection baseplate module 1 may be screwed to the mounting plate 25. The screws are held in the baseplate by means of keyhole-shaped receptacles. During installation, the screws are pre-screwed into the baseplate. The baseplate module 1 is then hooked into the screws by means of the keyhole geometries and finally screwed from the front of the baseplate module 1.

Figure 18B:
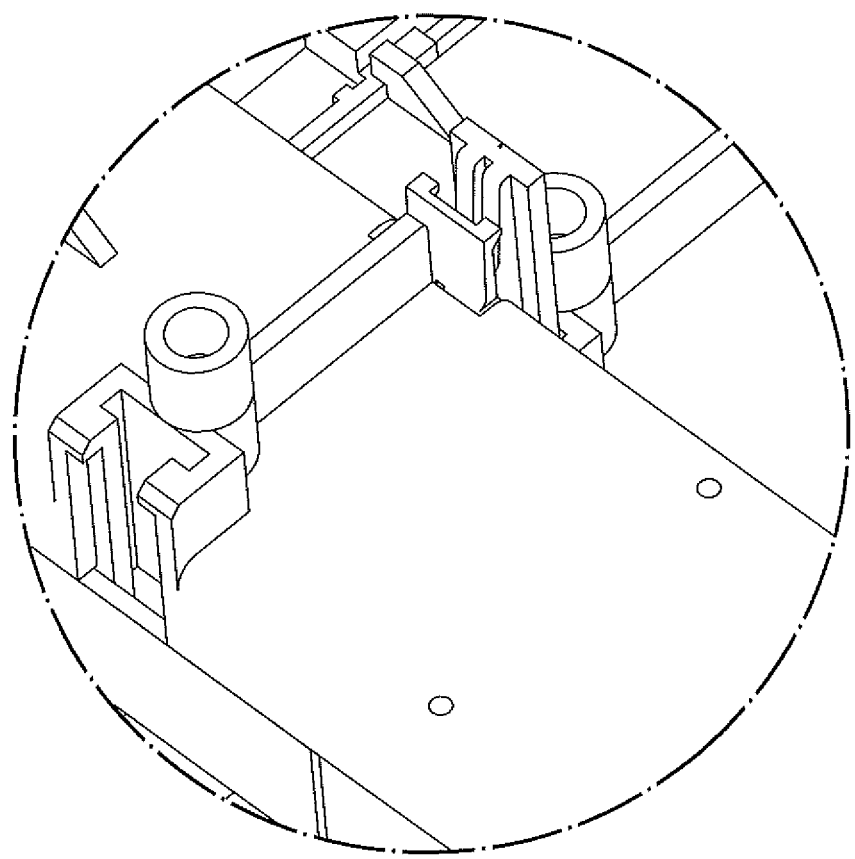
FIG. 18B shows a detail of the mechanical interface for mounting additional baseplate modules.

FIGS. 18A, 18B show another mounting option for a contact protection baseplate module 1, as it may be used with the power busbar system in accordance to the invention. FIGS. 18A, 18B show a mechanical connection for mounting further contact protection additional modules to the contact protection baseplate module 1. FIG. 18B shows a detailed view of the mechanical connection made. The mechanical connection is further illustrated by FIGS. 19A, 19B, 19C. As may be seen in FIG. 19C, a contact protection baseplate module 1 is extended by additional modules 26, 27 at one edge. As shown in FIG. 19A, in the case of the embodiment shown, latching slide extensions 28, 29 are inserted into the additional modules 26, 27, and the two additional modules 26, 27 are latched together using the latching slide extension elements 28, 29, as shown in FIG. 19B. The interconnected additional modules 26, 27 are then mechanically connected to the main baseplate module 1, as shown in FIG. 19C. This is done using mechanical connections to connect contact protection baseplate modules 1 or additional modules to each other. The additional modules 26, 27 may also be mounted if the baseplate module 1 is already installed on a mounting plate 25 in a switch cabinet.

Figure 20A:
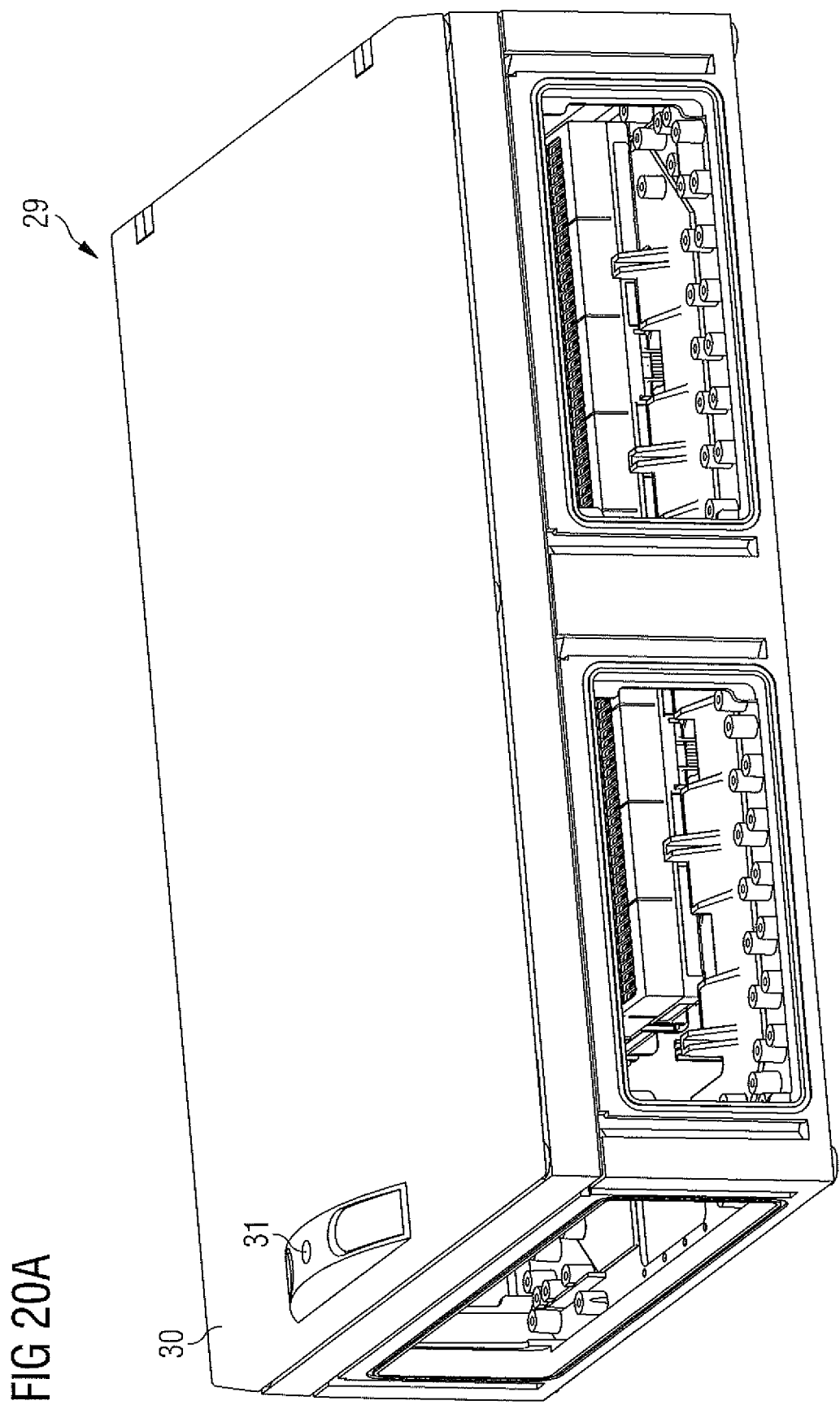
Figure 20B:
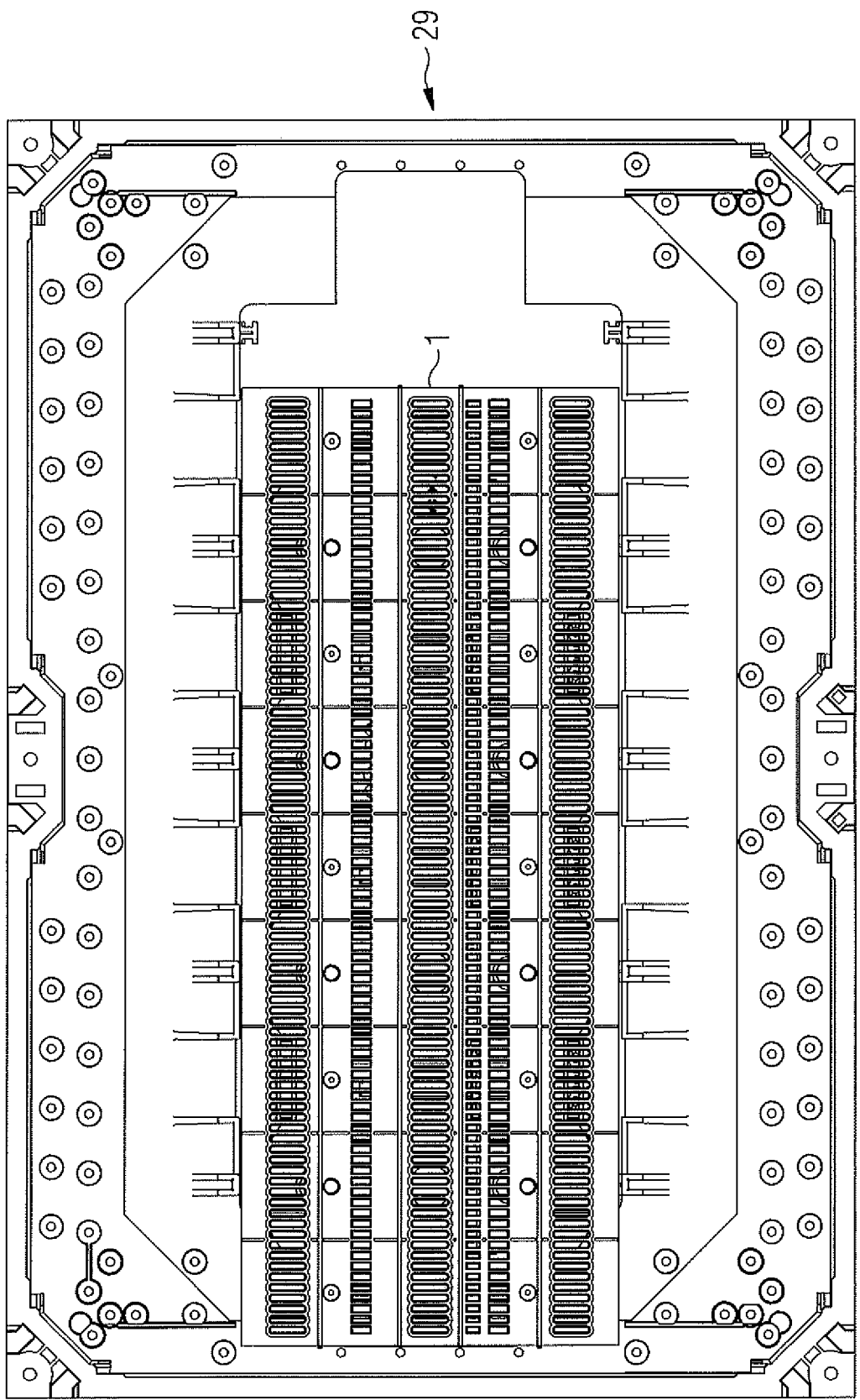

FIGS. 20A, 20B, 20C show another embodiment of the power busbar system in accordance to the invention. In the embodiment shown in FIGS. 20A, 20B, 20C, the contact protection baseplate module 1 is integrated directly into a switch cabinet housing 29. The switch cabinet housing 29 is used to accommodate several devices or switching devices 11 that are mounted and inserted into the integrated baseplate module 1 and, if necessary, locked by means of latching elements. The switch cabinet housing 29 may have a removable or rotatable cover 30, as shown in FIG. 20A, in a possible embodiment. This protective cover 30 has a handle 31 for opening the switch cabinet 29, in one possible embodiment.

FIG. 20B shows a view of switch cabinet 29 after removing or opening cover 30. FIG. 20B shows a view from above of the baseplate module 1 integrated in switch cabinet housing 29.

FIG. 20C shows a view from the rear of the switch cabinet 29 shown in FIG. 20A. The rear of the switch cabinet housing 29 in the example shown has fasteners 10 for fastening the switch cabinet directly to a mounting rail 23, in particular a top-hat rail. In the exemplary embodiment shown, the mechanical fasteners have three latching elements 17-*i*, as they have already been described in detail with reference to FIG. 14.

Figure 21:
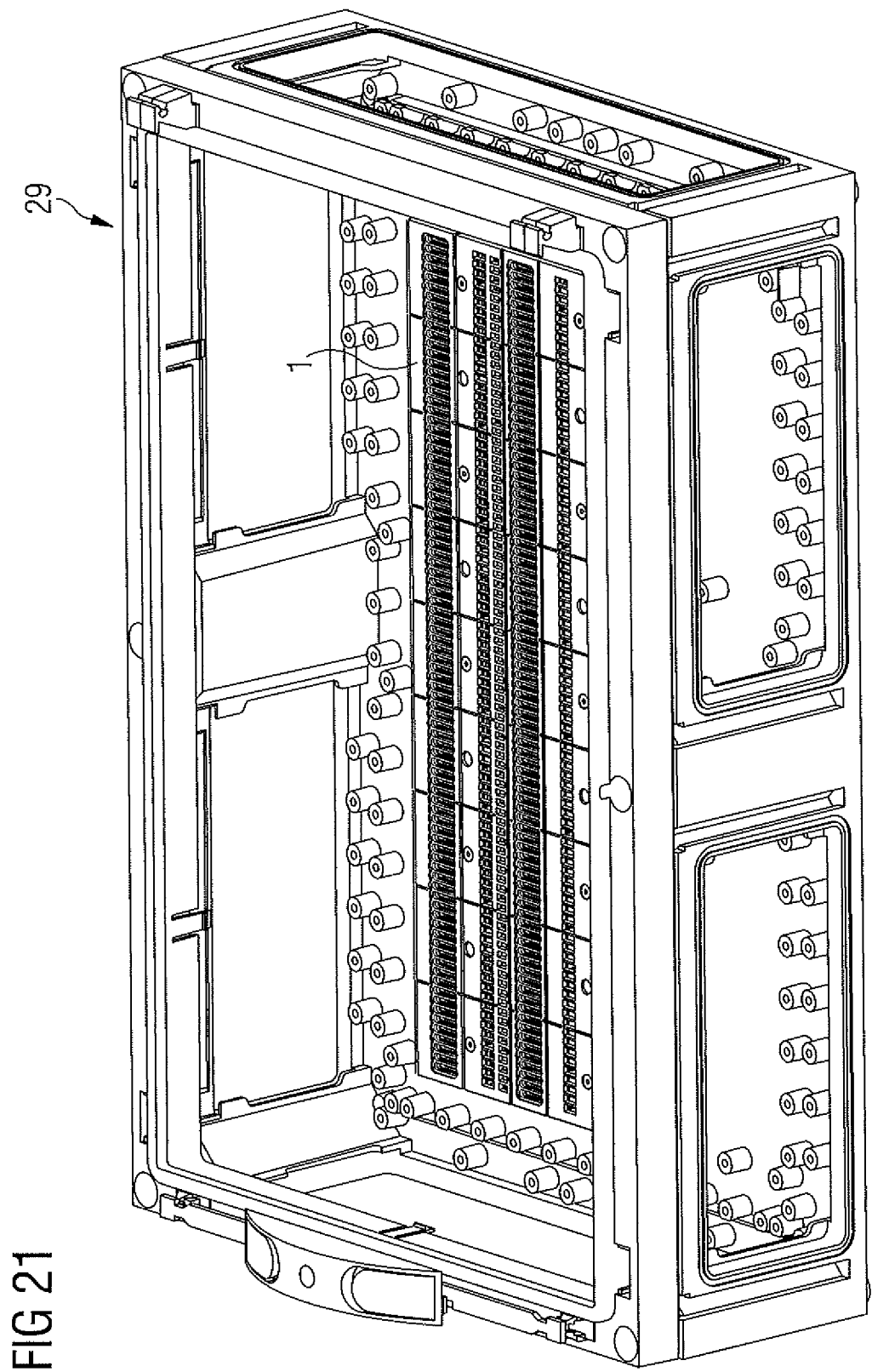
FIG. 21 is a perspective view of another exemplary embodiment of the power busbar system in accordance to the invention.

FIG. 21 is a perspective view of another embodiment for a switch cabinet or a switch cabinet housing 29 with an integrated contact protection baseplate module 1. The contact protection baseplate module 1 may be mounted on a mounting plate 25, a DIN rail or another mounting system. The contact protection baseplate module 1 is preferably available in different lengths from 135 mm to 495 mm. A combination with conventional busbars is possible in another possible embodiment. The protection against accidental contact may be further increased by additional slot covers in accordance with IP40. The current or voltage may be supplied from the front or from the rear.

The baseplate module 1 is molded or molded-onto the switch cabinet housing in one possible embodiment. Alternatively, the baseplate module 1 is clipped into the switch cabinet housing or latched into the switch cabinet housing.

As shown in FIGS. 5, 6, the additional modules 26, 27 may have feed-through openings 7 located on the front side of the extended baseplate module 1. The additional modules 26, 27 may also be adapted in such a way that they have feed-through openings 7 which are located on the rear side of the extended baseplate module 1. Furthermore, the additional modules 26, 27 may have feed-through openings 7 on the end faces. Contact plugs that contact busbar modules 6, which are included in the additional modules or Crossbars 26, 27, may be inserted into the feed-through openings 7 of the additional modules 26, 27. These contact plugs are used to feed current and/or voltage into the power busbar system, in one possible embodiment.

In a further embodiment, connection contacts 13 of devices 11 or plug contacts of connection plugs are passed through the feed-through slots 7 of the baseplate module 1 or through the feed-through slots 7 of an additional module 26, 27 and contact the end face of the power busbar contained in the baseplate module 1 or the additional module 26, 27 for electrical contacting of the power busbar. With this embodiment, conventional busbars without contact openings may also be used.

In a further embodiment, the lower part 3 of the baseplate module 1 also has feed-through slots 7 for feed-through of connection contacts 13 or plug contacts of plugs. The baseplate module 1 has rows 4-*i* of feed-through slots 7 on both sides, i.e. on the front and on the rear, for attaching devices 11 and supply plugs.

In another possible embodiment, a baseplate module 1, which is symmetrical and has feed-through slots 7 on both sides, is mounted in the switch cabinet with its front side similar to an electronic circuit board and equipped with devices 11 or supply plugs on both sides.

This allows the number of devices 11 within a switch cabinet housing with a specified volume to be increased further.

The invention claimed is:

1. A power busbar system for connecting two or more devices having at least one contact protection baseplate module for receiving elongated and electrically conductive power busbar modules, wherein the power busbar modules each have a plurality of uniformly spaced contact openings of a contact-opening array,
   wherein electrical connection contacts of each of the two or more devices to be connected are configured to be inserted into the contact openings of the contact-opening array of the electrically conductive busbar modules for establishing an electrical and mechanical connection.

2. The busbar system in accordance to claim 1, wherein the contact protection baseplate module has a U-shaped contour (10) on its rear side for receiving a mounting rail.

3. The busbar system in accordance to claim 1, wherein the connection contacts of each of the two or more devices to be connected to the power busbar system are V-shaped or finger-shaped and are each to be passed through feed-through slots of the contact protection cover plate and are to be inserted into underlying contact openings of a power busbar module contained in the baseplate module.

4. The busbar system in accordance to claim 1, wherein the contact protection cover plate of the baseplate module comprises coding openings for polarity reversal protection ribs for the correct connection of the two or more devices to one of the busbar modules of the busbar system.

5. The busbar system in accordance to claim 1,
   wherein the contact protection baseplate module comprises, in addition to busbar modules, electrical data lines for communication between the two or more devices connected to the busbars, and/or
   wherein the two or more devices connected to the busbar system communicate with one another directly by means of the busbars contained in the contact protection baseplate module by means of powerline communication, and/or
   wherein the two or more devices connected to the busbar system communicate with each other by means of a wireless radio interface.

6. The busbar system in accordance to claim 1, wherein measuring modules for current and voltage measurement are provided on the power busbar modules contained in the contact protection baseplate module.

7. The busbar system in accordance to claim 1, wherein the contact protection baseplate module comprises, in addition to power busbar modules, electrical supply lines for transmitting auxiliary supply voltages for measuring modules provided in the contact protection baseplate module and/or for connected devices.

8. The busbar system in accordance to claim 1, wherein the contact protection baseplate module comprises mechanical connecting elements for connection to further contact protection baseplate modules.

9. The busbar system in accordance to claim 1, wherein the contact protection baseplate module comprises shock-absorbing and/or vibration-damping connecting elements for mechanical support of connected devices.

10. The busbar system in accordance to claim 1, wherein the contact protection baseplate module comprises feed-in components for feeding current into the busbar system.

11. The busbar system in accordance to claim 1, wherein the contact protection baseplate module provides IP20 or IP30 contact protection, wherein IP40 contact protection is achievable by means of additional covers.

12. The busbar system in accordance to claim 1, wherein a power supply module of the power busbar system is provided for feeding various electrical current phases into power busbars of the power busbar system arranged in parallel in the baseplate module, each of the power busbars composed of a power busbar module, wherein the power supply module comprises, for each of the power busbar arranged in parallel in the baseplate module, a contact protection connection pin with electrical connection contacts for insertion into the contact openings of a power busbar module.

13. The busbar system in accordance to claim 1, wherein a contact protection bridge module of the power busbar system has on both sides in each case a plurality of connection contacts for insertion into the contact openings which are located at the ends of two elongated and electrically conductive adjacent power busbar modules of a power busbar of the power busbar system, each of which is covered by a cover module, the contact protection bridge module having on both sides centrally arranged feed-through openings for passing through connection contacts which, for connecting each of the two or more devices to the busbar system, is configured to be inserted into the contact openings of the contact-opening array of the two electrically conductive busbar modules assembled by the bridge module.

14. The busbar system in accordance to claim 1, wherein a contact protection end-cap module of the busbar system comprises a plurality of connection contacts for insertion into the contact openings of the contact-opening array, wherein the connection contacts are located at one end of the elongated and electrically conductive busbar module of a busbar of the busbar system, which busbar module is covered by a contact protection cover module, the contact protection end-cap module having centrally arranged feed-through openings for passing through connection contacts which, for connecting each of the two or more devices to the busbar system, is configured to be inserted into the contact openings of the contact-opening array, and wherein the contact openings are arranged below the contact protection end-cap module.

15. The busbar system in accordance to claim 1, wherein a contact protection elongated cover module of the busbar system comprises at each of its two ends a recess which is provided for an end-cap module, a side of a bridge module or a connecting pin of a power supply module of the busbar system into the contact openings of the contact opening array of electrically conductive busbars of the busbar system in order to form a contact protection cover plate of the busbar system.

16. The busbar system in accordance to claim 1,
wherein each of the two or more devices to be connected to the busbar system is configured to be latched onto the busbars of the busbar system composed of the busbar modules for producing a mechanical connection,
wherein each of the two or more devices to be connected to the busbar system additionally has latching means which are configured to be latched onto a cover plate and/or into latching webs of the contact protection baseplate module of the busbar system running parallel to the busbar modules, the latching means of each of the two or more devices to be connected to the busbar system having latching lugs which, for unlocking and locking the mechanical connection, are attached to a manually operable latching means of each of the two or more devices to be connected which is configured to be displaced laterally relative to the busbar modules of the busbar system within a housing of each of the two or more devices to be connected.

17. The busbar system in accordance to claim 1, wherein the connection contacts of each of the two or more devices for establishing the electrical and mechanical connection are self-sprung or externally spring-loaded.

18. The busbar system in accordance to claim 1, wherein each of the two or more devices to be connected to the power busbar system is an electrical, electronic or electromechanical device which has electrical connection contacts and/or contact protection ribs and/or latching means-for establishing a mechanical connection to the power busbar system and/or reverse polarity protection ribs for correct connection to the power busbar system in order to establish an electrical connection to the power busbar system.

19. The busbar system in accordance to claim 1, wherein the contact protection baseplate module of the busbar system comprises first busbar modules for different current phases of the busbar system and second busbar modules for protective conductors of the busbar system.

20. The busbar system in accordance to claim 1, wherein the contact protection baseplate module is integrated into a switch cabinet housing for receiving a plurality of devices which are inserted into the contact openings of the contact-opening array of the busbar modules contained in the at least one contact protection baseplate module.

21. The busbar system in accordance to claim 1, wherein the contact protection baseplate module comprises on its rear side at least one latching element which is configured to act on both sides which engage behind a mounting rail from above and from below for frontal mounting without tilting.

22. The busbar system in accordance to claim 1, wherein additional modules and/or vibration-damping connecting elements are configured to be attached to the baseplate module in an installed condition of the base plate module.

23. The busbar system in accordance to claim 1, wherein the current or voltage is fed into the power busbar modules from the front or from the rear of the baseplate module.

24. The busbar module for a power busbar system in accordance to claim 1, wherein the power busbar module comprises a plurality of uniformly spaced contact openings of a contact opening array, and comprises a flat, closed or U-shaped cross profile with two opposing side walls, the opposing side walls being connected to one another by means of a connecting web which has the contact openings of the contact-opening array for inserting spring-loaded electrical connection contacts of each of the two or more devices to be connected or of a supply module, a bridge module, an end-cap module or of another module of the busbar system.

25. The busbar system in accordance to claim 1,
wherein the power busbar modules contained in the contact protection baseplate module comprise a U-shaped cross profile with one side wall or two opposing side walls which are adapted to conduct an electric current with a predetermined maximum current amplitude,
wherein the electrical connection contacts are spring-loaded electrical connection contacts, and
wherein the opposing side walls are connected to one another by means of a connecting web which has the contact openings of the contact-opening array for insertion of spring-loaded electrical connection contacts of each of the two or more devices to be connected, the side walls of the transverse profile being adapted for electrical conduction of a current phase with a predetermined maximum current amplitude.

26. The busbar system in accordance to claim 25, wherein the electrically conductive power busbar modules are covered with at least one contact protection cover plate which has feed-through openings arranged in at least one row for feeding through connection contacts,
wherein the connection contacts for connecting one of the two or more devices or a further module are configured to be inserted into the contact openings of the contact-opening array of the electrically conductive busbar modules, and wherein the contact openings are located directly below the feed-through openings.

27. The busbar system in accordance to claim 25, wherein the contact protection baseplate module of the current collection system is adapted to receive a plurality of power busbars arranged therein, which each consist of at least one power busbar module.

28. The busbar system in accordance to claim 1 wherein the contact protection baseplate module is adapted to receive a plurality of power busbars arranged therein, which each consist of at least one power busbar module.

29. The busbar system in accordance to claim 28, wherein the electrically conductive power busbar modules are covered with at least one contact protection cover plate which has feed-through openings arranged in at least one row for feeding through the connection contacts,
wherein the connection contacts for connecting each of the two or more devices or a further module are configured to be inserted into the contact openings of the contact-opening array of the electrically conductive busbar modules, and wherein the contact openings are located directly below the feed-through openings.

* * * * *